(12) United States Patent
Kim et al.

(10) Patent No.: US 9,237,563 B2
(45) Date of Patent: Jan. 12, 2016

(54) METHOD AND DEVICE FOR TRANSMITTING CONTROL INFORMATION IN WIRELESS COMMUNICATION SYSTEM

(75) Inventors: Jinmin Kim, Anyang-si (KR); Seunghee Han, Anyang-si (KR); Hyunwoo Lee, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 14/000,952

(22) PCT Filed: Mar. 2, 2012

(86) PCT No.: PCT/KR2012/001581
§ 371 (c)(1),
(2), (4) Date: Aug. 22, 2013

(87) PCT Pub. No.: WO2012/118347
PCT Pub. Date: Sep. 7, 2012

(65) Prior Publication Data
US 2013/0329691 A1 Dec. 12, 2013

Related U.S. Application Data

(60) Provisional application No. 61/448,204, filed on Mar. 2, 2011.

(51) Int. Cl.
*H04W 4/00* (2009.01)
*H04W 72/04* (2009.01)
*H04L 5/00* (2006.01)

(52) U.S. Cl.
CPC ........... *H04W 72/0413* (2013.01); *H04L 5/001* (2013.01); *H04L 5/0057* (2013.01); *H04L 5/0023* (2013.01); *H04L 5/0078* (2013.01); *H04L 5/0098* (2013.01)

(58) Field of Classification Search
CPC ..................................................... H04W 36/023
USPC .......... 370/252, 253, 254, 328, 329, 331, 330
See application file for complete search history.

(56) References Cited

U.S. PATENT DOCUMENTS

| | | | |
|---|---|---|---|
| 2009/0181708 A1* | 7/2009 | Kim et al. | 455/501 |
| 2009/0215480 A1* | 8/2009 | Kim et al. | 455/501 |
| 2010/0238821 A1* | 9/2010 | Liu et al. | 370/252 |

(Continued)

FOREIGN PATENT DOCUMENTS

| | | |
|---|---|---|
| KR | 20090082851 A | 7/2009 |
| KR | 20100002114 A | 1/2010 |
| KR | 20100117522 A | 11/2010 |

*Primary Examiner* — Chuong T Ho
(74) *Attorney, Agent, or Firm* — Dentons US LLP

(57) ABSTRACT

The present invention relates to a wireless communication system. More particularly, the present invention relates to a method for executing a channel state information (CSI) report in a wireless communication system, and a device therefor, the method comprising the steps of: composing a plurality of CSI information blocks corresponding to a plurality of serving cells in a first set; and transmitting, in a first subframe, a physical uplink shared channel (PUSCH) signal including the plurality of CSI information blocks, wherein, when a predetermined serving cell with limited CSI generation is included in the plurality of serving cells, the CSI information blocks corresponding to the predetermined serving cells include a specific CSI related to a second subframe, and the second subframe is a subframe having a CSI report executed before the first subframe.

10 Claims, 18 Drawing Sheets

(56) References Cited

U.S. PATENT DOCUMENTS

| | | | |
|---|---|---|---|
| 2011/0032895 A1 | 2/2011 | Englund et al. | |
| 2011/0249578 A1* | 10/2011 | Nayeb Nazar et al. | 370/252 |
| 2012/0127869 A1* | 5/2012 | Yin | H04L 1/0031 370/252 |
| 2013/0114554 A1* | 5/2013 | Yang | H04W 24/10 370/329 |
| 2013/0230004 A1* | 9/2013 | Nam | H04L 5/001 370/329 |

* cited by examiner

PUCCH formats 2,2a and 2b structure (normal CP case)

PUCCH formats 2,2a and 2b structure (normal CP case)

METHOD AND DEVICE FOR TRANSMITTING CONTROL INFORMATION IN WIRELESS COMMUNICATION SYSTEM

This Application is a 35 U.S.C. §371 National Stage Entry of International Application No. PCT/KR2012/001581, filed Mar. 2, 2012 and claims the benefit of U.S. Provisional Application No. 61/448,204, filed Mar. 2, 2011, all of which are incorporated by reference in their entirety herein.

TECHNICAL FIELD

The present invention relates to a wireless communication system and, more specifically, to a method and device for transmitting control information. The wireless communication system can support carrier aggregation (CA).

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting control information in a wireless communication system and a device for the same. Another object of the present invention is to provide a channel format, signal processing scheme and device for the same for efficiently transmitting control information. Another object of the present invention is to provide a method for efficiently allocating resources for transmitting control information and a device for the same.

The technical problems solved by the present invention are not limited to the above technical problems and those skilled in the art may understand other technical problems from the following description.

Technical Solution

The object of the present invention can be achieved by providing a method for reporting channel state information (CSI) in a wireless communication system, the method including: configuring a plurality of CSI blocks corresponding to a plurality of serving cells in a first set; and transmitting a physical uplink shared channel (PUSCH) signal including the plurality of CSI blocks in a first subframe, wherein, when a predetermined serving cell in which CSI generation is limited is included in the plurality of serving cells, a CSI block corresponding to the predetermined serving cell includes specific CSI related to a second subframe, the second subframe being a subframe in which CSI reporting has been performed prior to the first subframe.

In another aspect of the present invention, provided herein is a communication device configured to report channel state information (CSI) in a wireless communication system, the communication device including: a radio frequency (RF) unit; and a processor, wherein the processor is configured to configure a plurality of CSI blocks corresponding to a plurality of serving cells in a first set and to transmit a physical uplink shared channel (PUSCH) signal including the plurality of CSI blocks in a first subframe, wherein, when a predetermined serving cell in which CSI generation is limited is included in the plurality of serving cells, a CSI block corresponding to the predetermined serving cell includes specific CSI related to a second subframe, the second subframe being a subframe in which CSI reporting has been performed prior to the first subframe.

The second subframe may include one or more subframes belonging to a subframe set for periodic CSI reporting.

The specific CSI may include one of one or more pieces of periodic CSI dropped during CSI reporting in the second subframe.

When plural pieces of periodic CSI are dropped during CSI reporting in the second subframe, the specific CSI may include CSI having highest priority from among the plural pieces of periodic CSI and, when plural pieces of periodic CSI having highest priority are present, the specific CSI may include CSI having a lowest cell index.

The specific CSI may include CSI having a longest period from among one or more pieces of periodic CSI dropped during CSI reporting in the second subframe.

The specific CSI may include periodic CSI about a serving cell in a second set different from the first set.

The predetermined serving cell may include a serving cell deactivated by a medium access control (MAC) element.

Advantageous Effects

According to the present invention, control information can be efficiently transmitted in a wireless communication system. Furthermore, a channel format, signal processing scheme and device for the same for efficiently transmitting control information can be provided. In addition, it is possible to efficiently allocate resources for transmitting control information.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE. While the following description is given, centering on 3GPP LTE/LTE-A to clarify the description, this is purely exemplary and thus should not be construed as limiting the present invention.

In a wireless communication system, a UE receives information from a BS through downlink (DL) and transmits information to the BS through uplink (UL). Information transmitted/received between the UE and BS includes data and various types of control information, and various physical channels are present according to type/purpose of information transmitted/received between the UE and BS.

Figure 1:
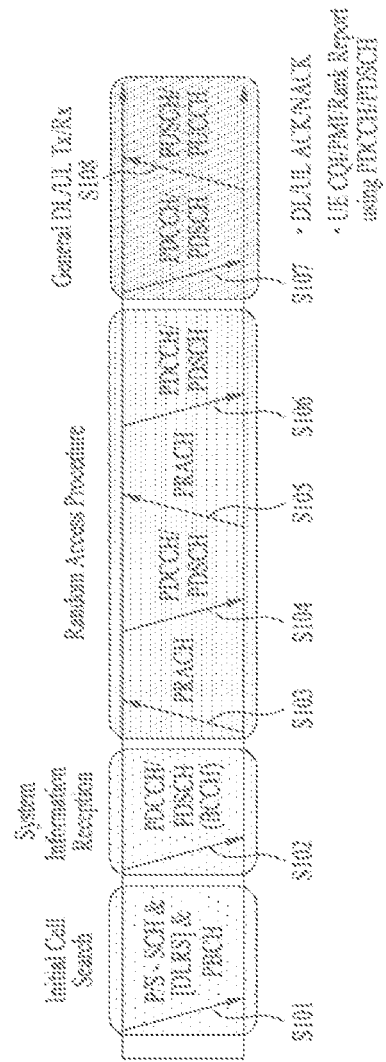
FIG. 1 illustrates physical channels used in a 3GPP LTE system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE is synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the mean time, the UE may determine a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a Hybrid Automatic Repeat and request Acknowledgement/Negative-ACK (HARQ ACK/NACK) signal, a scheduling request (SR), channel state information (CSI), etc. The CSI includes a channel quality indicator (CQI), a precoding Matrix Index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
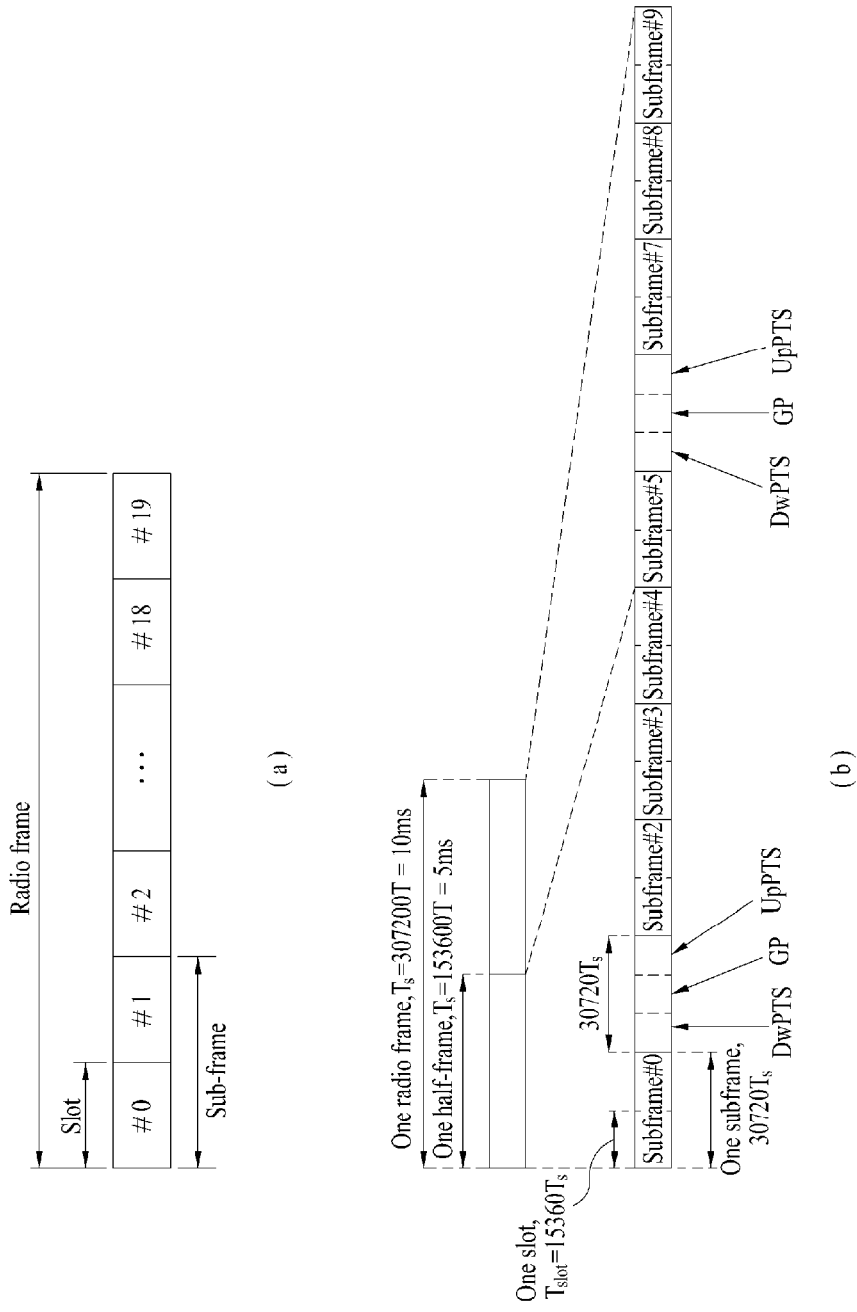
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
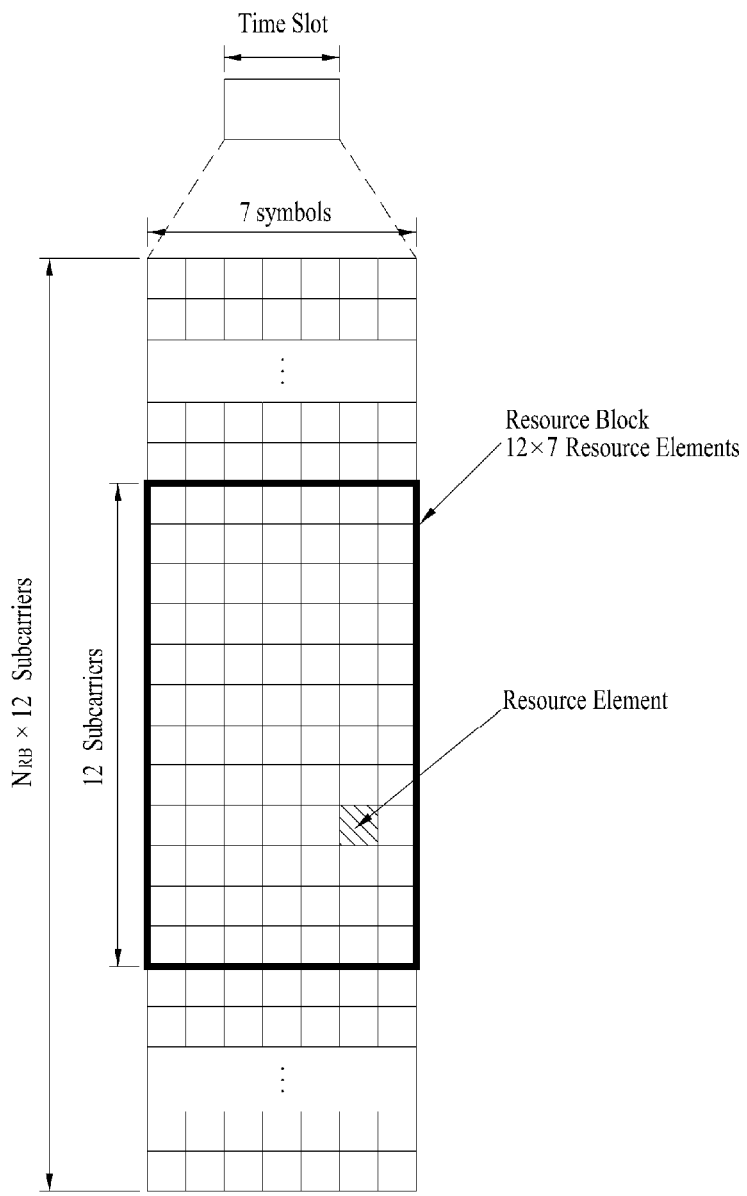
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
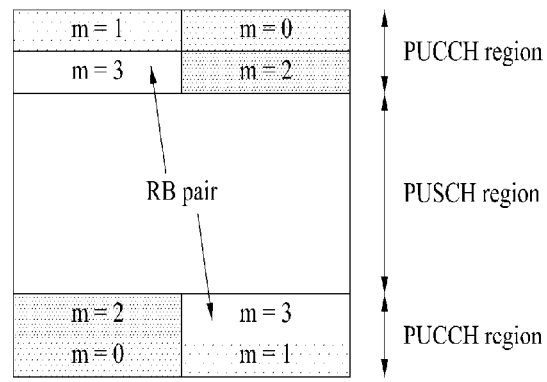
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. For example, a slot can include 7 SC-FDMA symbols in the case of normal CP. The uplink subframe is divided into a control region and a data region. The data region includes a PUSCH and is used to carry a data signal such as audio data. The control region includes a PUCCH and is used to carry UCI. The PUCCH includes an RB pair (e.g. m=0, 1, 2, 3) located at both ends of the data region in the frequency domain and hopped in a slot boundary.

Figure 5:
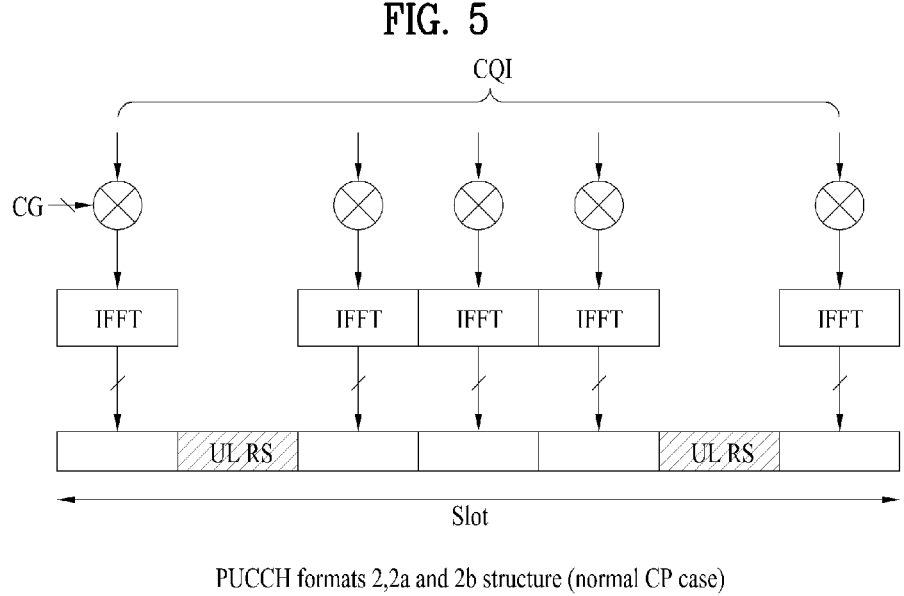
FIGS. 5 and 6 illustrate slot level structures of PUCCH formats 2/2a/2b.
Figure 6:
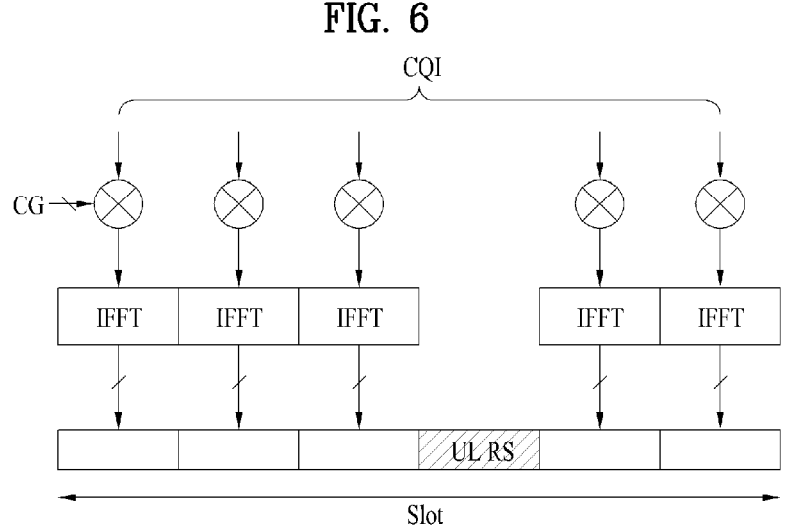

FIG. 5 illustrates PUCCH formats 2/2a/2b in case of normal CP and FIG. 6 illustrates PUCCH formats 2/2a/2b in case of extended CP. Referring to FIGS. 5 and 6, one subframe includes 10 QPSK data symbols in addition to RS symbols in case of normal CP. Each of the QPSK symbols is spread in the frequency domain according to CS and then mapped to a corresponding SC-FDMA symbol. SC-FDMA symbol level CS hopping may be applied to randomize inter-cell interference. An RS may be multiplexed according to CDM using CSs. For example, if the number of available CSs is 12 or 6, 12 or 6 UEs can be multiplexed in the same physical resource block (PRB).

CSI (e.g. CQI, PMI and RI) and a combination of CSI and ACK/NACK may be transmitted through PUCCH formats 2/2a/2b. In this case, Reed-Muller (RM) channel coding is applicable.

Channel coding for a UI CSI in LTE is described as follows. A bit stream $a_0, a_1, a_2, a_3, \ldots, a_{A-1}$ is channel-coded using RM code (20,A). Table 1 shows a base sequence for code (20,A). Here, $a_0$ and $a_{A-1}$ denote a most signifiant bit (MSB) and a least significant bit (LSB). In the case of extended CP, a maximum number of information bits is 11 in cases other than a case in which CSI and ACK/NACK are simultaneously transmitted. The CQI may be subjected to QPSK after being coded into 20 bits using the RM code. The coded bits may be scrambled before being subjcted to QPSK.

TABLE 1

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated according to Equation 1.

$$b_i = \sum_{n=0}^{A-1} (a_n \cdot M_{i,n}) \bmod 2 \quad \text{[Expression 1]}$$

Here, i=0, 1, 2, . . . , B−1.

Table 2 shows an uplink control information (UCI) field for wideband report (single antenna port, transmit diversity or open loop spatial multiplexing PDSCH) CSI feedback.

TABLE 2

| Field | Bits |
|---|---|
| Wideband CQI | 4 |

Table 3 shows a UCI field for wideband CQI and PMI feedback.

TABLE 3

| | Bits | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI(Precoding Matrix Index) | 2 | 1 | 4 | 4 |

Table 4 shows a UCI field for RI feedback for wideband report.

TABLE 4

| | Bits | | |
|---|---|---|---|
| | | 4 antenna ports | |
| Field | 2 antenna ports | Maximum 2 layers | Maximum 4 layers |
| RI (Rank Indication) | 1 | 1 | 2 |

Figure 7:
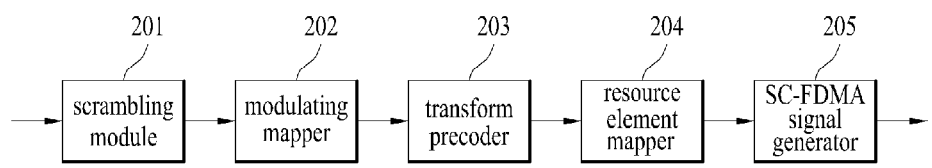
FIG. 7 illustrates an uplink signal processing procedure.

FIG. 7 illustrates a signal processing procedure through which a UE transmits an uplink signal.

Referring to FIG. 7, a scrambling module 201 may scramble a transmitted signal using a UE-specific scramble signal. The scrambled signal is input to a modulation mapper 202 in which the scrambled signal is modulated into complex symbols using Binary Phase Shift Keying (BPSK), Quadrature Phase Shift Keying (QPSK) or 16-Quadrature amplitude Modulation (QAM)/64-QAM according to signal type and/or channel status. The modulated complex symbols are processed by a transform precoder 203, and then applied to a resource element mapper 204. The resource element mapper 204 may map the complex symbols to resource elements. The signal processed in this manner may be subjected to an SC-FDMA signal generator 205 and transmitted to a BS through an antenna.

Figure 8:
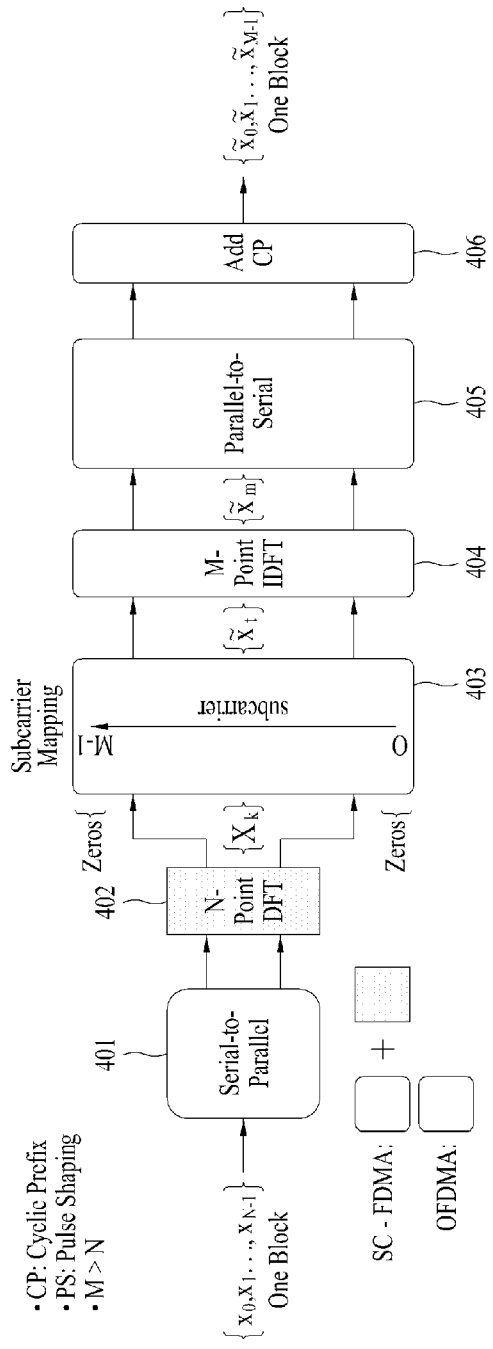
FIG. 8 illustrates SC-FDMA and OFDMA.

FIG. 8 illustrates SC-FDMA and OFDMA schemes. 3GPP employs OFDMA in downlink and uses SC-FDMA in uplink.

Referring to FIG. 8, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402. The N-point DFT module 402 offsets the influence of IDFT processing of the M-point IDFT module 404 such that a transmitted signal has single carrier property.

Figure 9:
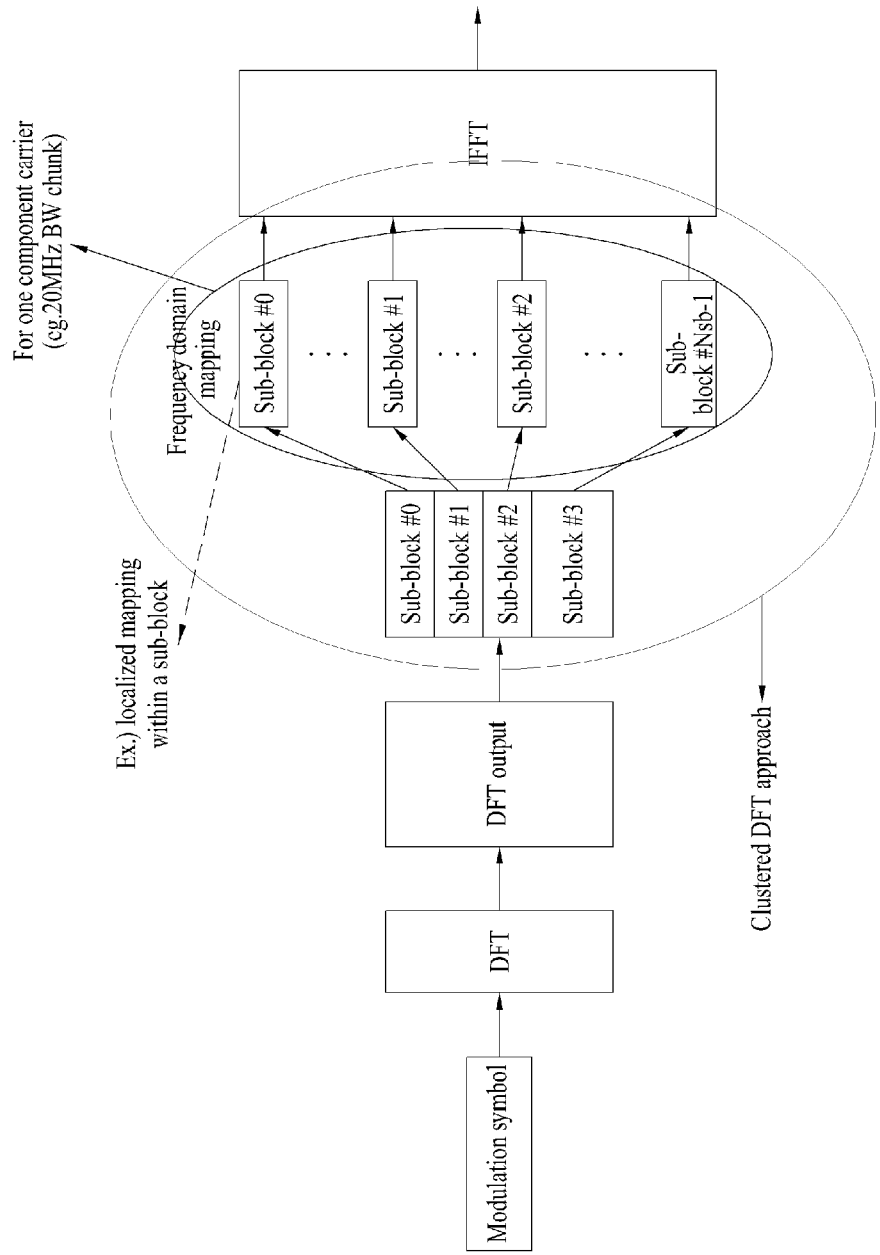
FIG. 9 illustrates a signal processing procedure for mapping DFT process output samples to a single carrier in clustered SC-FDMA.
Figure 10:
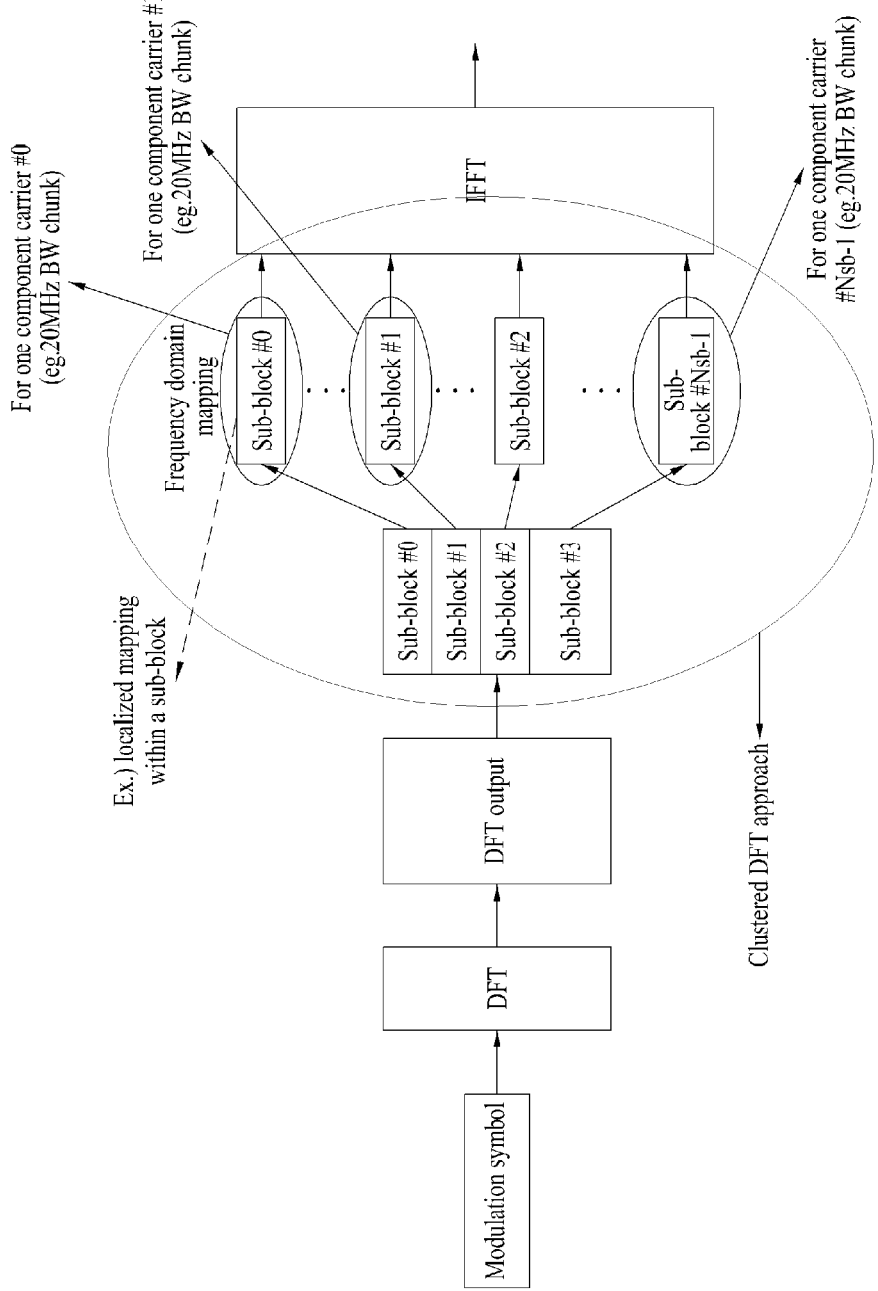
FIGS. 10 and 11 illustrate a signal processing procedure of mapping DFT process output samples to multiple carriers in clustered SC-FDMA.
Figure 11:
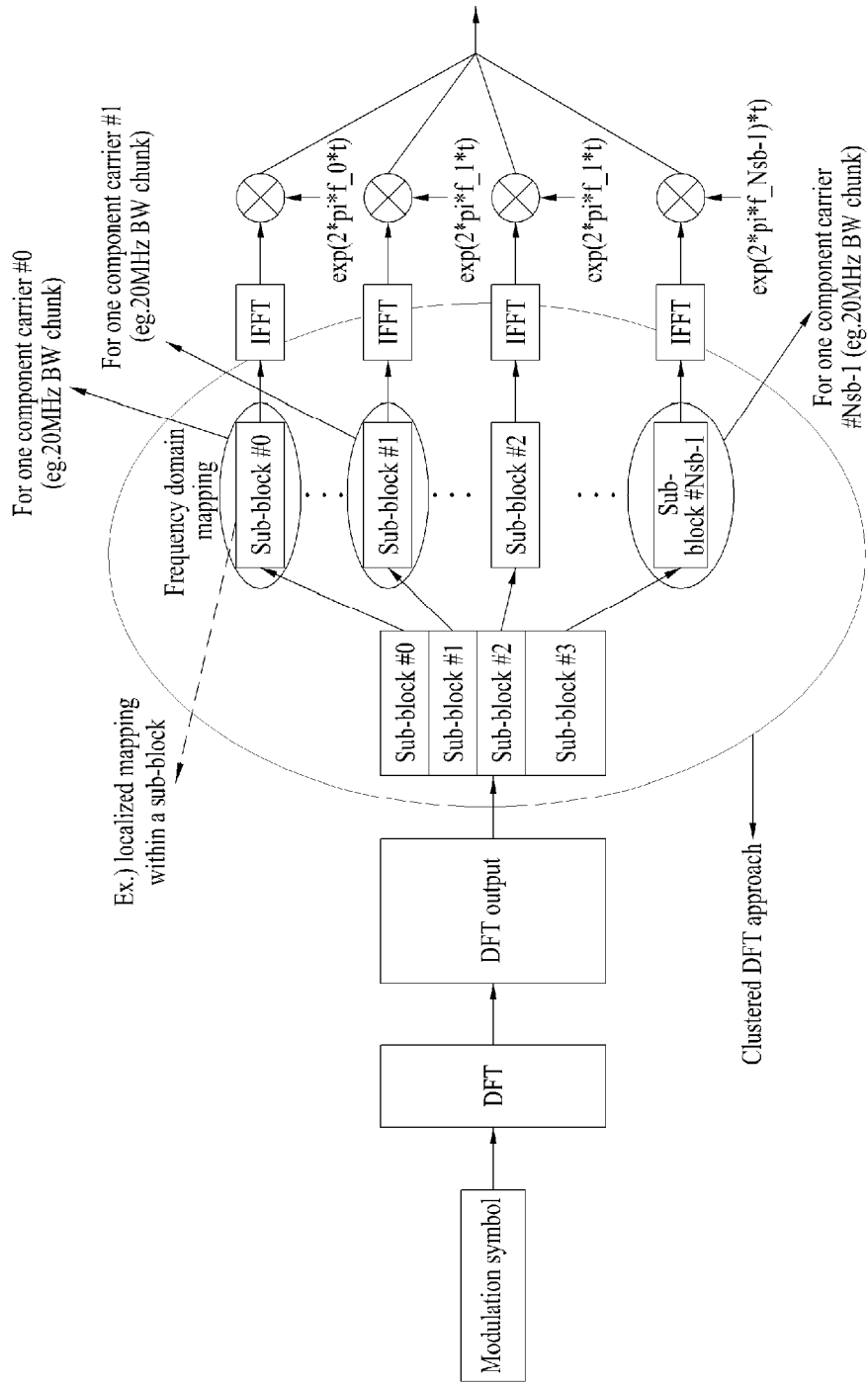

FIG. 9 illustrates a signal processing procedure for mapping DFT process output samples to a single carrier in clustered SC-FDMA. FIGS. 10 and 11 illustrate a signal processing procedure for mapping DFT process output samples to multiple carriers in clustered SC-FDMA. FIG. 9 shows an example of application of intra-carrier clustered SC-FDMA while FIGS. 10 and 11 show examples of application of inter-carrier clustered SC-FDMA. FIG. 10 illustrates a case in which a signal is generated through a single IFFT block when subcarrier spacing between neighboring component carriers is set while component carriers are contiguously allocated in the frequency domain. FIG. 11 shows a case in which a signal is generated through a plurality of IFFT blocks when component carriers are non-contiguously allocated in the frequency domain.

Figure 12:
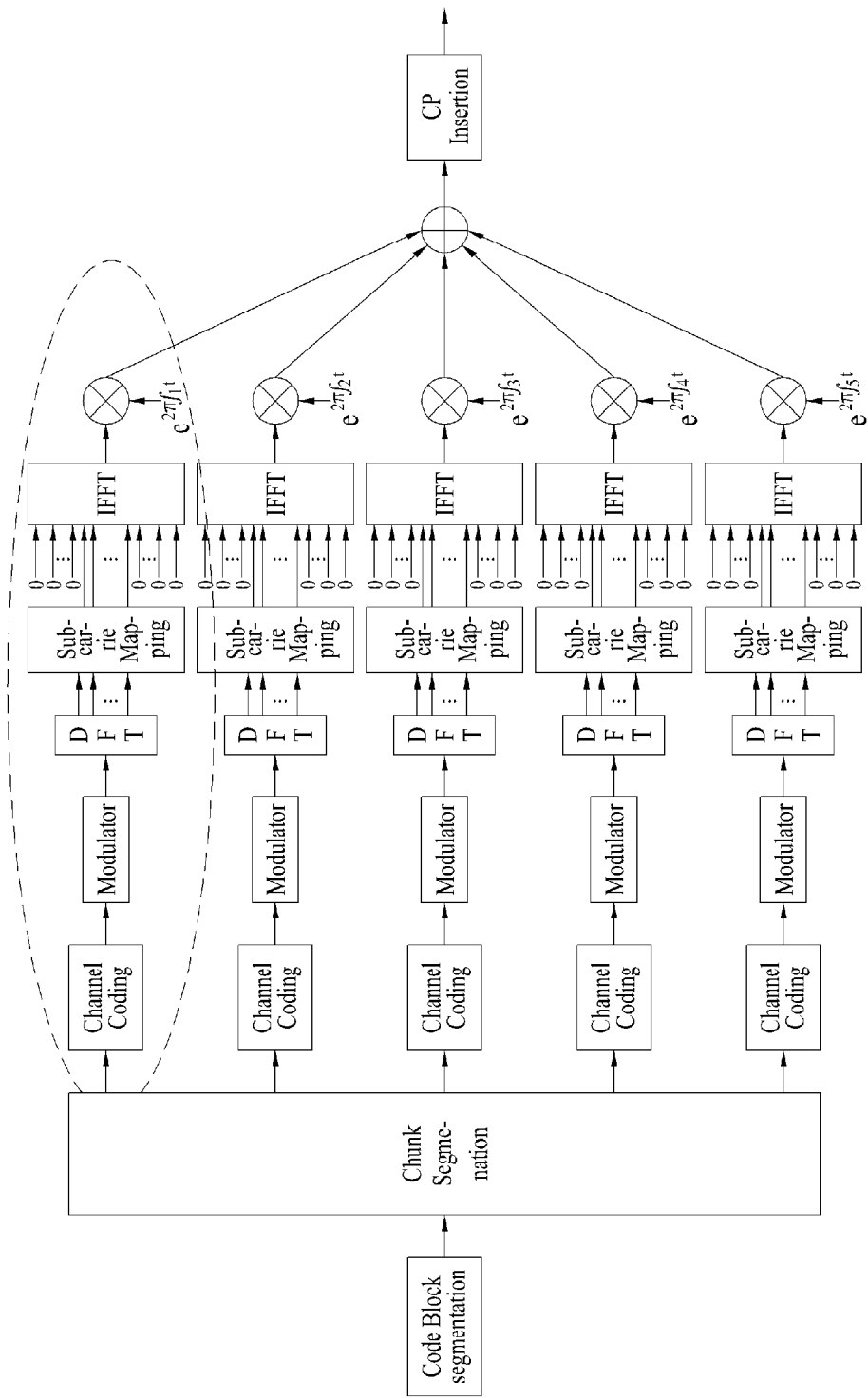
FIG. 12 illustrates a signal processing procedure in segmented SC-FDMA.

FIG. 12 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT spread OFDMA (NxDFT-s-OFDMA). Referring to FIG. 12, the segmented SC-FDMA is characterized in that total time-domain modulated symbols are divided and assigned to N groups (N is an integer larger than 1) and a DFT process is performed on a group-by-group basis to relieve the single carrier property constraint.

A multi-carrier system or a carrier aggregation system means a system using aggregation of a plurality of carriers (in other words, component carriers) having a bandwidth narrower than a target bandwidth for supporting a wideband. When the plurality of carriers having a bandwidth narrower than the target bandwidth are aggregated, the bandwidth of the aggregated carriers may be limited to the bandwidths used in existing systems for backward compatibility with the existing systems. For example, an LTE system supports bandwidths of 1.4 MHz, 3 MHz, 5 MHz, 10 MHz, 15 MHz and 20 MHz and an LTE-A system evolved from the LTE system can support bandwidths wider than 20 MHz using bandwidths supported by the LTE system. Alternatively, a new bandwidth may be defined to support carrier aggregation irrespective of the bandwidths used in existing systems. The term 'multi-carrier' can be used with carrier aggregation and bandwidth aggregation. Carrier aggregation includes both contiguous carrier aggregation and non-contiguous carrier aggregation.

Figure 13:
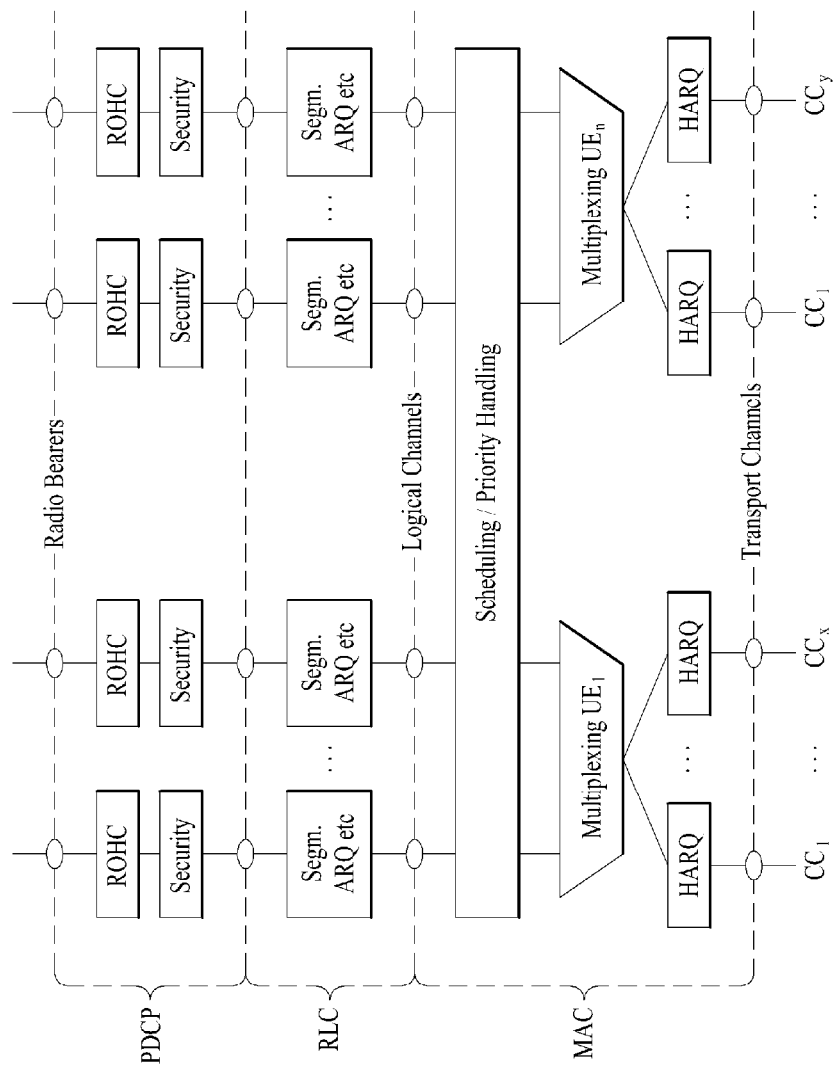
FIG. 13 illustrates a concept of management of downlink component carriers in a base station (BS)
Figure 14:
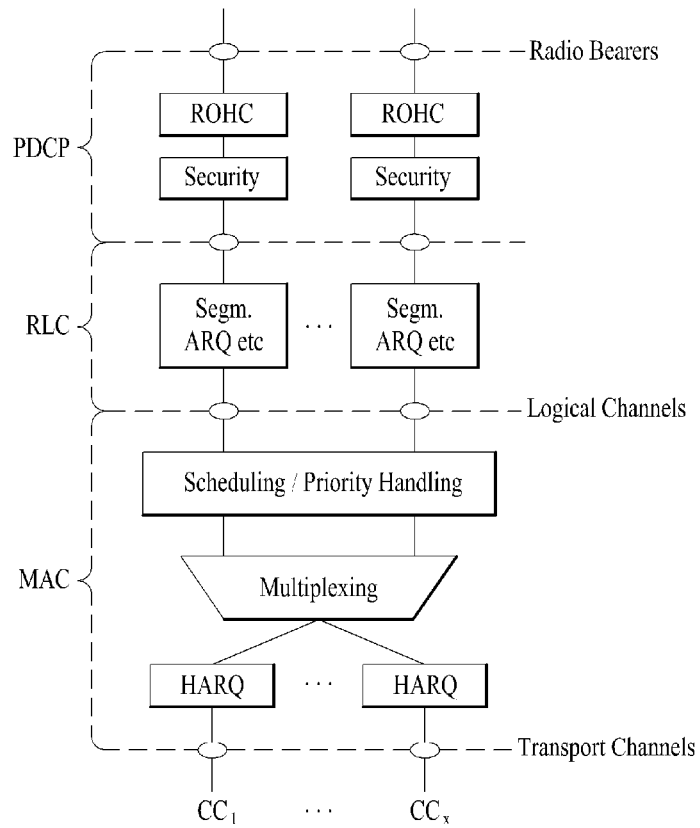
FIG. 14 illustrates a concept of management of uplink component carriers in a user equipment (UE)

FIG. 13 illustrates a concept of management of downlink component carriers in a BS and FIG. 14 illustrates a concept of management of uplink component carriers in a UE. For convenience, a higher layer is a MAC layer in the following description. The term 'component carrier' can be replaced by an equivalent term (e.g. cell).

Figure 15:
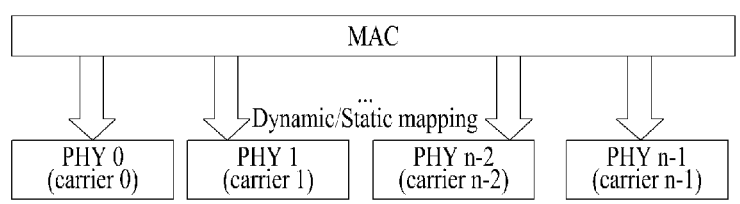
FIG. 15 illustrates a concept of management of multiple carriers by one MAC layer in a BS.
Figure 16:
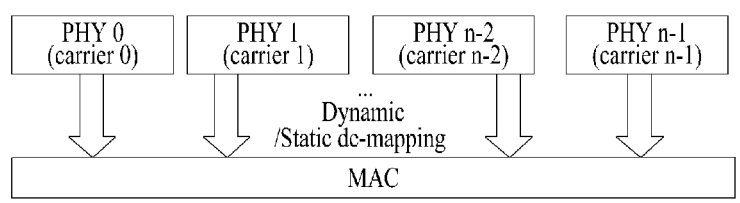
FIG. 16 illustrates a concept of management of multiple carriers by one MAC layer in a UE.

FIG. 15 illustrates a concept of management of multiple carriers by one MAC layer in a BS and FIG. 16 illustrates a concept of management of multiple carriers by one MAC layer in a UE.

Referring to FIGS. 15 and 16, one MAC layer manages and operates one or more frequency carriers for transmission and reception. In this case, resource management is flexible because frequency carriers managed by one MAC layer need not be contiguous. In FIGS. 15 and 16, one PHY layer corresponds to one component carrier. Here, one PHY layer does not necessarily mean an independent radio frequency (RF) device. While one independent RF device means one PHY layer in general, one RF device is not limited thereto and may include multiple PHY layers.

Figure 17:
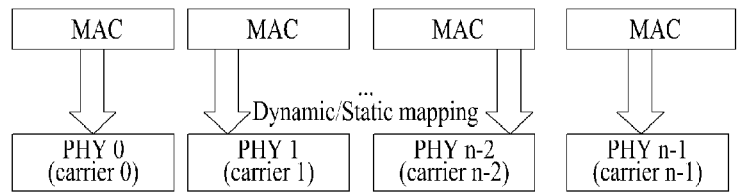
FIG. 17 illustrates a concept of management of multiple carriers by one MAC layer in a BS.
Figure 18:
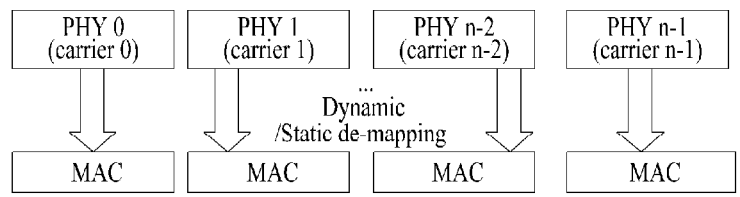
FIG. 18 illustrates a concept of management of multiple carriers by multiple MAC layers in a UE.

FIG. 17 illustrates a concept of management of multiple carriers by multiple MAC layers in a BS and FIG. 18 illustrates a concept of management of multiple carriers by multiple MAC layers in a UE. FIG. 17 illustrates another concept of management of multiple carriers by multiple MAC layers in a BS and FIG. 18 illustrates another concept of management of multiple carriers by multiple MAC layers in a UE.

Distinguished from the structures shown in FIGS. 15 and 16, multiple carriers may be controlled by multiple MAC layers instead of one MAC layer as shown in FIGS. 17 to 20.

Figure 19:
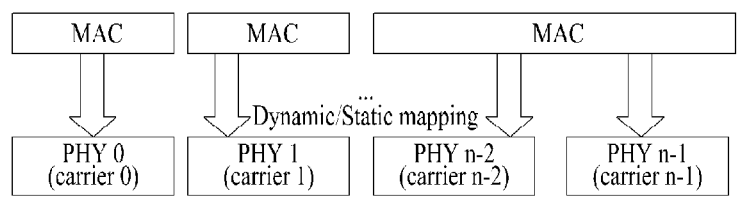
FIG. 19 illustrates a concept of management of multiple carriers by multiple MAC layers in a BS.
Figure 20:
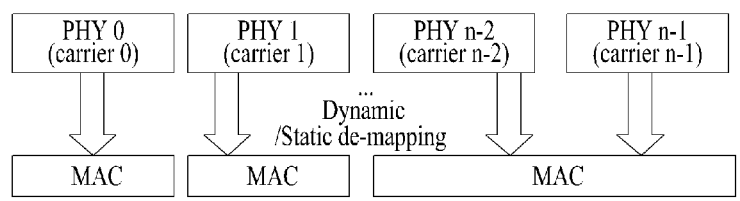
FIG. 20 illustrates a concept of management of multiple carriers by one or more MAC layers in a UE.

Multiple MAC layers may control one-to-one multiple carriers as shown in FIGS. 17 and 18. Referring to FIGS. 19 and 20, MAC layers may control one-to-one some carriers and one MAC layer may control other carriers.

The above-described system includes one to N carriers which are contiguous or non-contiguous. A TDD system is constructed such that N carriers for downlink transmission and uplink transmission are operated and an FDD system is constructed such that multiple carriers are respectively used for uplink and downlink. The FDD system may support asymmetrical carrier aggregation in which the number of aggregated carriers and/or a carrier bandwidth in uplink is different from those in downlink. In the case of non-cross-carrier scheduling, a PDCCH and a corresponding PDSCH are transmitted in the same DL CC. For example, if the PDCCH is transmitted in DL CC #0, the corresponding PDSCH is also transmitted in the DL CC #0. In the case of cross-carrier scheduling, the PDCCH and PDSCH are transmitted in different DL CCs.

DL/UL CCs include DL/UL primary CCs and DL/UL secondary CCs. The DL primary CC may be defined as a DL CC linked with the UL primary CC. Here, linkage includes both implicit linkage and explicit linkage. In LTE, a DL CC and a UL CC are uniquely paired. For example, a DL CC linked with the UL primary CC according to LTE pairing may be called a DL primary CC. This can be regarded as implicit linkage. Explicit linkage refers to previous configuration of linkage by a network and may be signaled through a radio resource control (RRC) message. In explicit linkage, a DL CC linked with the UL primary CC may be called a DL primary CC. Here, the UL primary CC may be a UL CC carrying a PUCCH. The DL primary CC may be configured through higher layer signaling. The DL primary CC may be a DL CC through which a UE performs initial access. DL CCs other than the DL primary CC may be called DL secondary CCs. Similarly, UL CCs other than the UL primary CC may be called UL secondary CCs.

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). Simply, a DL CC and a UL CC may be respectively called a DL cell and a UL cell. Furthermore, a DL primary CC and a UL primary CC may be respectively called a DL PCell and a UL PCell. The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, a plurality of serving cells including a PCell and one or more SCells can be configured for a UE in an RRC_CONNECTED state, for which CA is set. A network may configure one or more SCells in addition to an initially configured PCell, for a UE supporting CA during connection setup after an initial security activation operation is initiated.

DL-UL pairing may correspond to FDD only. DL-UL pairing may not be additionally defined for TDD because TDD uses the same frequency. DL-UL linkage may be determined from UL linkage through UL E-UTRA absolute radio frequency channel number (EARFCN) information of SIB2. For example, DL-UL linkage can be obtained through SIB2 decoding in the event of initial access and acquired through RRC signaling in other cases. Accordingly, only SIB2 linkage is present and other DL-UL pairings may not be explicitly defined. For example, in a 5DL:1UL structure, DL CC#0 and UL CC#0 have an SIB2 linkage relationship and other DL CCs may have the SIB2 linkage relationship with other UL CCs that are not set to the corresponding UE.

Figure 21:
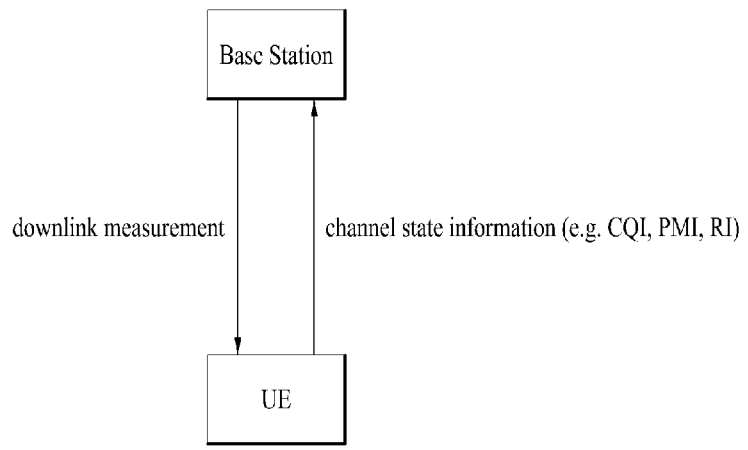
FIG. 21 illustrates channel state information generation and transmission.

FIG. 21 illustrates channel status information generation and transmission.

Referring to FIG. 21, a UE measures downlink quality using a reference signal and reports channel status information to a BS. The BS performs downlink scheduling (UE selection, resource allocation, etc.) according to the reported channel status information. The channel status information includes at least one of CQI, PMI and RI. The CQI may be generated through various methods. For example, channel state (or spectral efficiency) can be quantized and signaled, an SINR can be calculated and signaled or a channel application state such as a modulation and coding scheme (MCS) can be signaled in order to generate the CQI.

In LTE, a common RS (CRS) is used for channel measurement. The CRS is used for channel information acquisition and data demodulation and transmitted per subframe. In LTE-A, a channel state information RS (CSI-RS) for channel measurement only may be used. The CSI-RS is intermittently transmitted on the time domain in order to reduce overhead. For example, the CSI-RS can be periodically transmitted at an interval of an integer multiple of a subframe or transmitted in a specific pattern. The period or pattern in which the CSI-RS is transmitted may be set by a BS.

Figure 22:
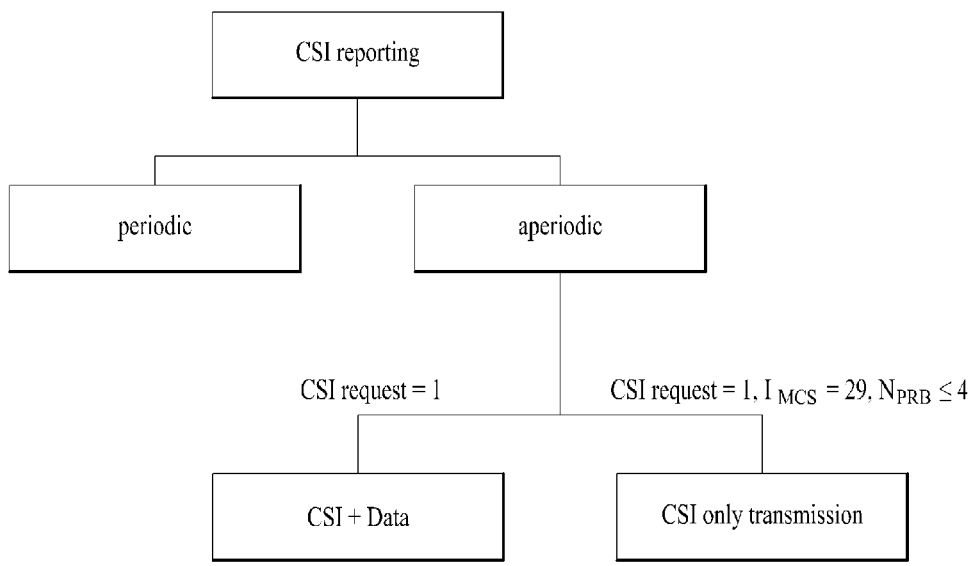
FIG. 22 illustrates a CQI reporting scheme of LTE.

FIG. 22 illustrates a CSI (e.g. CQI, PMI and RI) reporting scheme. Referring to FIG. 22, CSI reporting is divided into periodic reporting and aperiodic reporting.

Periodic CSI reporting refers to reporting channel quality by a UE at a predetermined time without additional signaling. Since CSI configuration information (e.g. CSI reporting period and a subframe offset for CSI reporting) for CSI reporting in a single carrier situation is set per CSI (e.g. CQI, PMI and RI), transmissions of different pieces of CSI information may collide in the same subframe. In this case, to handle collision, transmission of specific CSI can be dropped in a subframe in which CSI collision occurs based on CSI importance (e.g. RI>CQI, wideband CSI>subband CSI) or transmission of CSI having a short CSI reporting period can be dropped.

Aperiodic CSI reporting refers to a process through which a network requests a UE to report CSI through explicit signaling as necessary. When aperiodic CSI reporting is needed, the network signals an uplink scheduling grant to the UE using DCI format 0. The UE performs aperiodic CSI reporting when a CSI request value of DCI format 0 is 1. Aperiodic CSI reporting (i.e. CSI request=1) is divided into a CSI only (transmission) mode and a CSI+data (transmission) mode. When the CSI request value is 1, an MCS index $I_{MCS}$ is 29 and the number of allocated PRBs is less than 4 ($N_{PRB} \leq 4$), the UE interprets the corresponding signaling as the CSI only mode. In other cases, the UE interprets the corresponding signaling as the CSI+data mode. In the CSI only mode, the UE transmits only CSI without data (i.e. UL-SCH (Uplink Shared Channel) transport block) on a PUSCH. In the CSI+data mode, the UE transmits CSI and data on a PUSCH. The CSI only mode may be normalized and called a feedback only mode and the CSI+data mode may be called a feedback+data mode.

Table 5 shows part of DCI format 0 indicating aperiodic PUSCH feedback in LTE. When a CQI request field is set to 1, the number of physical resource blocks (PRBs) is less than 4 and MCS index $I_{MCS}$ is set to 29 in DCI format 0, the UE feeds back downlink channel information (or channel state information (CSI)) on a PUSCH.

TABLE 5

| | bits | aperiodic PUSCH Feedback |
|---|---|---|
| RB assignment | 7 | PRB <= 4 |
| MCS | 5 | $I_{MCS}$ = 29 |
| CQI request | 1 | 1 |

* MCS: modulation and coding scheme

Figure 23:
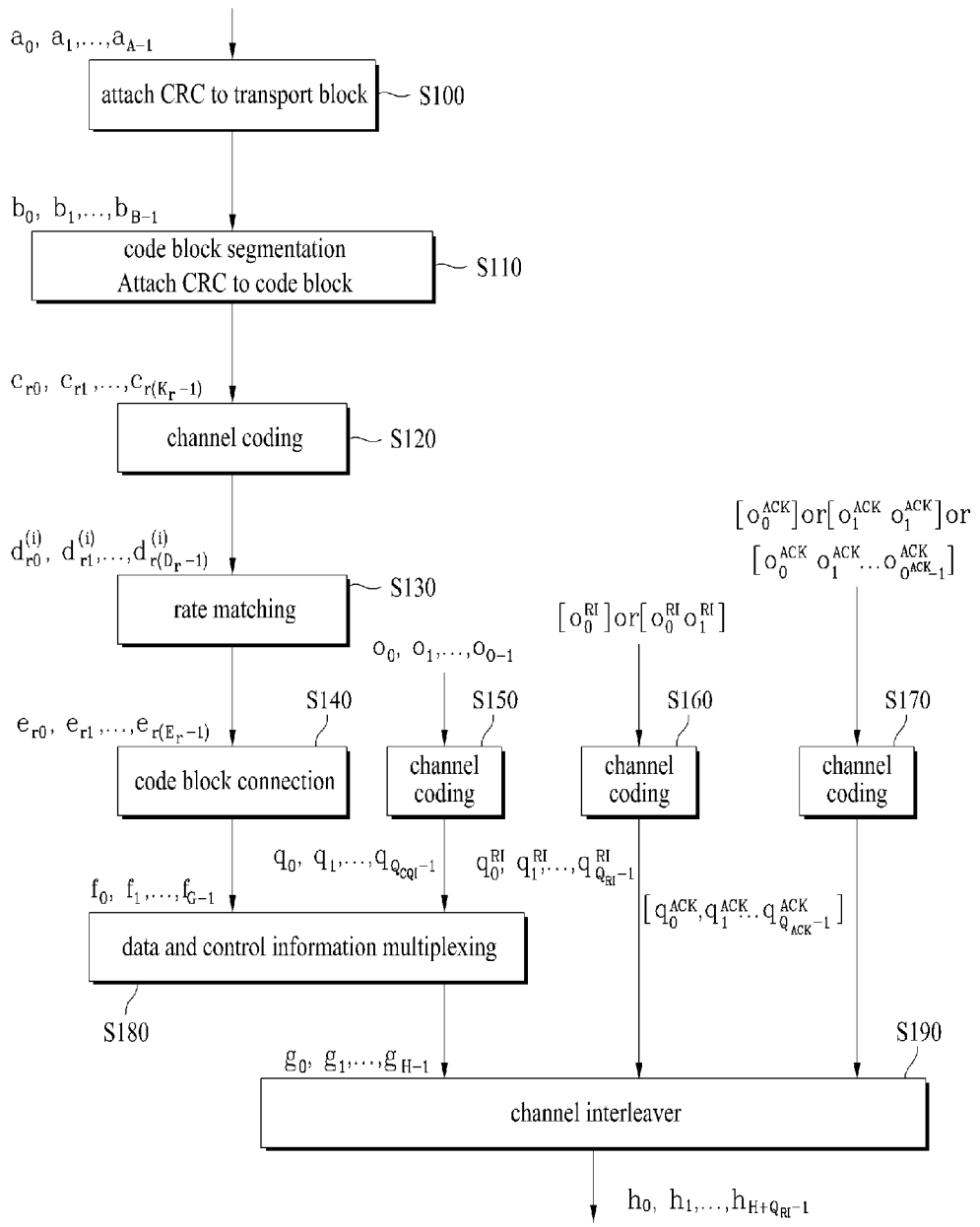
FIG. 23 illustrates a procedure of processing UL-SCH data and control information.

FIG. 23 illustrates a procedure of processing UL-SCH data and control information. When a UE attempts to transmit control information in a subframe to which PUSCH transmission is assigned, the UE multiplexes control information (UCI) and UL-SCH data before DFT-spreading. While periodic CSI is transmitted on a PUCCH, the periodic CSI is piggyback on the PUSCH when transmitted in a subframe to which PUSCH transmission is allocated. Aperiodic CSI is transmitted in PUSCH format 2/2a/2b.

Referring to FIG. 23, error detection is performed by attaching a CRC (Cyclic Redundancy Check) to a UL-SCH transport block (S100).

The whole UL-SCH transport block is used to calculate a CRC parity bit. The transport block is composed of bits $a_0, a_1, a_2, a_3, \ldots, a_{A-1}$. Parity bits are $p_0, p_1, p_2, p_3, \ldots, p_{L-1}$. The transport block has a size of A and the number of parity bits is L.

After attachment of the CRC to the transport block, code block segmentation and code block CRC attachment are performed (S110). Bits $b_1, b_2, b_3, \ldots, b_{B-1}$ are input for code block segmentation. B represents the number of bits of the transport block (including the CRC). After code block segmentation, bits $c_{r0}, c_{r1}, c_{r2}, c_{r3}, \ldots, c_{r(K_r-1)}$ are acquired. Here, r denotes a code block number (r=0, 1, ..., C−1) and Kr denotes the number of bits of a code block r. C represents the number of code blocks.

Channel coding follows code block segmentation and code block CRC attachment (S120). Bits $d_{r0}^{(i)}, d_{r1}^{(i)}, d_{r2}^{(i)}, d_{r3}^{(i)}, \ldots, c_{r(D_r-1)}^{(i)}$ are generated from channel coding. Here, i=0, 1 and 2, $D_r$ denotes the number of bits of an i-th coded stream for the code block r (i.e. $D_r = K_r + 4$), r denotes a code block number (r=0, 1, ..., C−1) and Kr denotes the number of bits of the code block r. C represents the number of code blocks. Turbo coding may be used for channel coding.

Rate matching is performed after channel coding (S130). Bits $e_{r0}, e_{r1}, e_{r2}, e_{r3}, \ldots, e_{r(E_r-1)}$ are generated from rate matching. Here, $E_r$ denotes the number of rate-matched bits of an r-th code block (r=0, 1, ..., C−1) and C denotes the number of code blocks.

Code block connection is performed after rate matching (S140). Bits $f_0, f_1, f_2, f_3, \ldots, f_{G-1}$ are generated from code block connection. Here, G denotes the number of encoded bits for transmission. When the control information is multiplexed with UL-SCH transmission, bits used for control information transmission are not included in G. Bits $f_0, f_1, f_2, f_3, \ldots, f_{G-1}$ correspond to a UL-SCH codeword.

In case of uplink control information, channel quality information (CQI and/or PMI), RI and HARQ-ACK are independently channel-coded. Channel coding of UCI is performed based on the number of encoded symbols for control information. For example, the number of encoded symbols can be used for rate matching of encoded control information. The number of encoded symbols corresponds to the number of modulation symbols and the number of REs in the following processes.

Channel coding of channel quality information is performed using an input bit sequence $o_0, o_1, o_2, \ldots, o_{O-1}$ (S150). An output bit sequence $q_0, q_1, q_2, q_3, \ldots, q_{Q_{CQI}-1}$ is obtained from channel coding of the channel quality information. A channel coding scheme applied to channel coding of the channel quality information depends on the number of bits of the channel quality information. When the channel quality information is 11 bits or more, a CRC bit is added thereto. $Q_{CQI}$ denotes the number of encoded bits. The encoded channel quality information may be rate-matched in order to adjust the length of the bit sequence to $Q_{CQI}$. $Q_{CQI}=Q'_{CQI} \times Q_m$. $Q'_{CQI}$ denotes the number of encoded symbols for CQI and $Q_m$ represents a modulation order. $Q_m$ is set to be equal to that of the UL-SCH data.

Channel coding of RI is performed using an input bit sequence $[o_0^{RI}]$ or $[o_0^{RI} \, o_1^{RI}]$ (S160). $[o_0^{RI}]$ and $[o_0^{RI} \, o_1^{RI}]$ respectively represent 1-bit RI and 2-bit RI.

In the case of 1-bit RI, repetition coding is used. For the 2-bit RI, a (3,2) simplex code is used and encoded data can be cyclically repeated. An output bit sequence $q_0^{RI}, q_1^{RI}, q_2^{RI}, \ldots, q_{Q_{RI}-1}^{RI}$ is acquired according to combination of encoded RI blocks. Here, $Q_{RI}$ denotes the number of encoded bits. To adjust the length of the encoded RI to $Q_{RI}$, part of the encoded RI blocks may be lastly combined (i.e. rate matching). $Q_{RI}=Q'_{RI} \times Q_m$, $Q'_{RI}$ denotes the number of encoded symbols for RI and $Q_m$ represents a modulation order. $Q_m$ is set to be equal to that of the UL-SCH data.

Channel coding of HARQ-ACK is performed using an input bit sequence $[o_0^{ACK}]$, $[o_0^{ACK} \, o_1^{ACK}]$ or $[o_0^{ACK} \, o_1^{ACK} \, o_2^{ACK} \ldots o_{O^{ACK}-1}^{ACK}]$ (S170). $[o_0^{ACK}]$ and $[o_0^{ACK} \, o_1^{ACK}]$ respectively represent 1-bit HARQ-ACK and 2-bit HARQ-ACK and $[o_0^{ACK} \, o_1^{ACK} \, o_2^{ACK} \ldots o_{O^{ACK}-1}^{ACK}]$ represents HARQ-ACK composed of information of two bits or more (i.e. $o^{ACK}>2$). ACK is encoded into 1 and NACK is encoded into 0. For the 1-bit HARQ-ACK, repetition coding is used. In case of the 2-bit HARQ ACK, (3,2) simplex code is used and encoded data may be cyclically repeated. $Q_{ACK}$ denotes the number of encoded bits. A bit sequence $q_0^{ACK}, q_1^{ACK}, q_2^{ACK}, \ldots q_{Q_{ACK}-1}^{ACK}$ is obtained according to combination of encoded HARQ-blocks. To adjust the length of the bit sequence to $Q_{ACK}$, part of the encoded HARQ-ACK blocks may be finally combined (i.e. rate matching). $Q_{ACK}=Q'_{ACK} \times Q_m$, $Q'_{ACK}$ denotes the number of encoded symbols for HARQ-ACK and $Q_m$ represents a modulation order. $Q_m$ is set to be equal to that of the UL-SCH data.

The encoded UL-SCH bits $f_0, f_1, f_2, f_3, \ldots, f_{G-1}$ and the encoded CQI/PMI bits $q_0, q_1, q_2, q_3, \ldots, q_{Q_{CQI}-1}$ are input to a data/control multiplexing block (S180). The data/control multiplexing block outputs $g_0, g_1, g_2, g_3, \ldots, g_{H'-1}$. Here, $g_i$ denotes a column vector of $Q_m$ (i=0, ..., H'-1) and H=(G+$Q_{CQI}$). H represents the number of encoded bits allocated for the UL-SCH data and CQI/PMI.

The output $g_0, g_1, g_2, g_3, \ldots, g_{H'-1}$ of the data/control multiplexing block, the encoded RI $q_0^{RI}, q_1^{RI}, q_2^{RI}, \ldots, q_{Q_{RI}-1}^{RI}$ and the encoded HARQ-ACK $q_0^{ACK}, q_1^{ACK}, q_2^{ACK}, \ldots, q_{Q_{ACK}-1}^{ACK}$ are input to a channel interleaver (S190). Here, $g_i$ denotes a column vector of $Q_m$ (i=0, ..., H'-1) for CQI/PMI (H'=H/$Q_m$), $q_i^{ACK}$ is a column vector of $Q_m$ (i=0, $Q'_{ACK}-1$) for ACK/NACK ($Q'_{ACK}=Q_{ACK}/Q_m$) and $q_i^{RI}$ is a column vector of $Q_m$ (i=0, $Q'_{RI}-1$) for RI ($Q'_{RI}=Q_{RI}/Q_m$).

The channel interleaver multiplexes the control information for PUSCH transmission and the UL-SCH data. Specifically, the channel interleaver maps the control information and UL-SCH data to a channel interleaver matrix corresponding to a PUSCH resource.

After channel interleaving, a bit sequence $h_0, h_1, h_2, \ldots, h_{H+Q_{RI}-1}$ read from the channel interleaver matrix column by column is output from the channel interleaver. The read bit sequence is mapped to a resource grid. H"=H'+$Q'_{RI}$ modulation symbols are transmitted through subframes.

Figure 24:
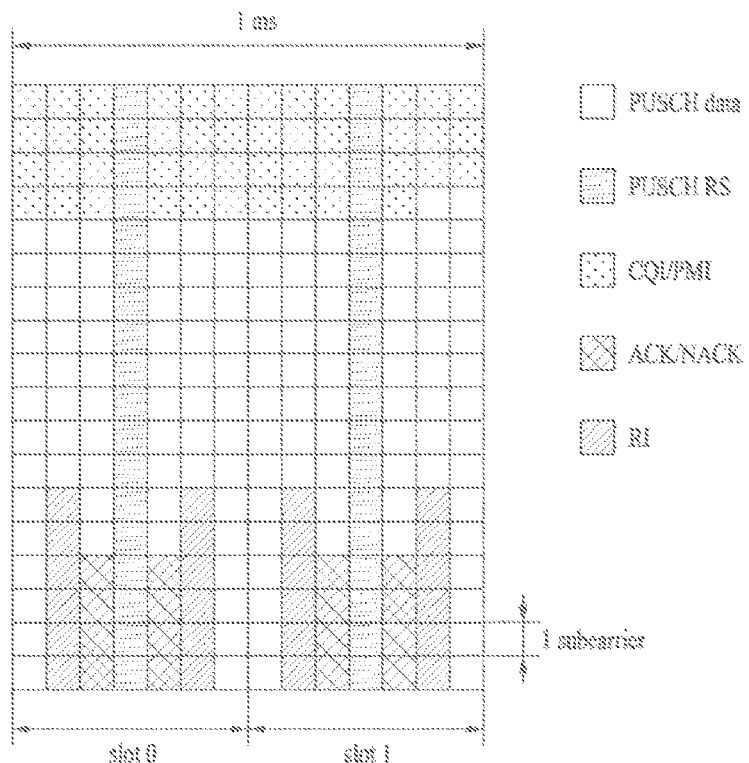
FIG. 24 illustrates multiplexing control information and UL-SCH data on a PUSCH.

FIG. 24 illustrates multiplexing of control information and UL-SCH data on a PUSCH. The control information includes at least one of CQI/PMI, HARQ ACK/NACK and RI. The number of REs used to transmit each of CQI/PMI, ACK/NACK and RI is based on a modulation and coding scheme (MCS) and an offset value ($\Delta_{offset}^{CQI}$, $\Delta_{offset}^{HARQ-ACK}$, $\Delta_{offset}^{RI}$) allow for PUSCH transmission. The offset value permits different coding rates according to control information and is semi-statically set through higher layer (RRC) signaling. The UL-SCH data and the control information are not mapped to the same RE. The control information is mapped to two slots of a subframe. The BS can easily demultiplex the control information and a data packet because the BS can be previously aware of transmission of the control information on a PUSCH.

Referring to FIG. 24, CQI and/or PMI (CQI/PMI) are disposed at the start of a UL-SCH data resource, sequentially mapped to all SC-FDMA symbols on a subcarrier and then mapped in the next subcarrier. The CQI/PMI is mapped in a subframe from the left to the right, that is, in a direction in which an SC-FDMA symbol index increases. The UL-SCH data is rate-matched in consideration of the quantity of CQI/PMI (i.e. the number of encoded symbols) and mapped in the same manner as CQI/PMI mapping after the CQI/PMI is mapped. When the CQI/PMI size (payload size) is small (e.g. less than 11 bits), a block code (32, k) is used for the CQI/PMI similarly to PUCCH transmission and encoded data can be cyclically repeated. When the CQI/PMI size is small, a CRC is not used. If the CQI/PMI size is large (e.g. greater than 11 bits), an 8-bit CRC is added to the CQI/PMI and channel coding and rate matching are performed on the CQI/PMI using a tail-biting convolutional code. ACK/NACK is inserted into part of SC-FDMA resources to which the UL-SCH data is mapped through puncturing. The ACK/NACK is disposed by an RS and mapped to corresponding SC-FDMA symbols starting from the lowest SC-FDMA symbol, that is, in a direction in which a subcarrier index increases. In case of normal CP, SC-FDMA symbols for the ACK/NACK correspond to SC-FDMA symbols #2/#5 in each slot, as shown in FIG. 24. Encoded RI is disposed by the symbols corresponding to the ACK/NACK irrespective of whether the ACK/NACK is actually transmitted in the corresponding subframe. The ACK/NACK, RI and CQI/PMI are independently encoded.

In LTE, control information (e.g. using QPSK) can be scheduled to be transmitted on a PUSCH without UL-SCH data. Specifically, in case of the CQI only mode of FIG. 22, a UE transmits channel state information only without a UL-SCH transport block. In this case, control information (CQI/PMI, RI and/or ACK/NACK) is multiplexed prior to DFT-spreading in order to maintain a single-carrier characteristic of low CM (cubic metric). Multipelxing of the ACK/NACK, RI and CQI/PMI is performed through a process similar to that shown in FIG. 23.

Figure 25:
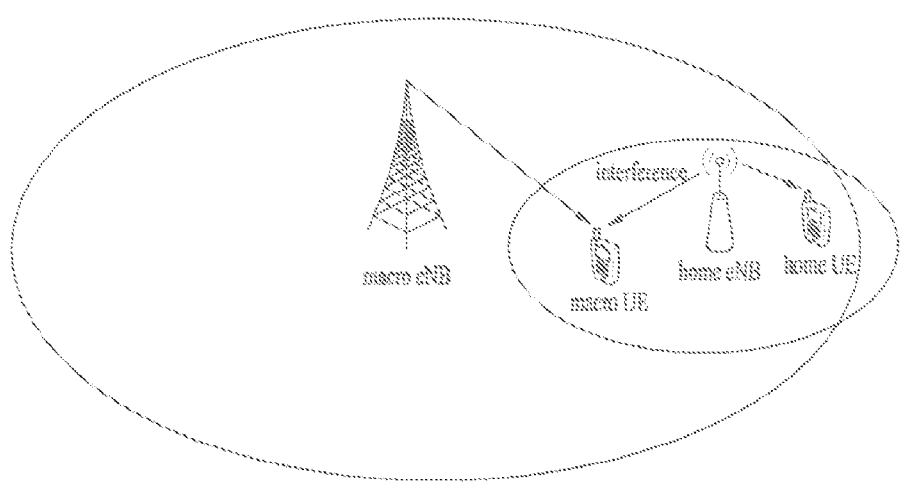
FIG. 25 illustrates a heterogeneous network including a macro cell and a micro cell.

FIG. 25 illustrates a heterogeneous network (HetNet) including a macro cell and a micro cell. Next-generation communication standards including LTE-A discuss a heterogeneous network in which a micro cell having a low transmit power is present within a conventional macro-cell coverage.

Referring to FIG. 25, the macro cell may overlap one or more micro cells. A macro cell service is provided by a macro eNB (MeNB). In the specification, the term 'macro cell' and the term 'macro eNB' can be used interchangeably. A UE linked to the macro cell may be called a macro UE. The macro UE receives a downlink signal from the MeNB and transmits an uplink signal to the MeNB.

A micro cell is also called a femto cell or a pico cell. Micro cell service is provided by a pico eNB, home eNB (HeNB), relay node (RN), etc. The pico eNB, HeNB and RN are commonly called an HeNB for convenience. Here, the term 'micro cell' and 'home eNB' may be interchangeably used. A UE linked with a micro cell may be called a micro UE or a home UE. The home UE receives a downlink signal from the HeNB and transmits an uplink signal to the HeNB.

Micro cells may be categorized into an open access (OA) cell and a closed subscriber group (CSG) cell according to accessibility. The OA cell refers to a micro cell in which a UE can be provided with a service as necessary without access restriction. The CSG cell refers to a micro cell in which only a specific permitted UE can be provided with a service.

Since the macro cell and micro cell overlap each other in the heterogeneous network, inter-cell interference is problematic. When a macro UE is located at the boundary of the macro cell and the micro cell, as shown in FIG. 25, a downlink signal from an HeNB may be applied as interference to the macro UE. Similarly, a downlink signal from a macro eNB may act as interference on a home UE in the micro cell. Furthermore, an uplink signal from the macro UE may act as interference on the HeNB. Similarly, an uplink signal from the home UE may act as interference on the macro eNB.

As described above, in a macro-pico heterogeneous network, a macro cell may apply severe interference to a pico UE, particularly, a pico UE located at a cell boundary. Accordingly, a method for cancelling uplink/downlink interference applied to data, an L1/L2 control signal, a synchronization signal and a reference signal is needed. Inter-cell interference cancellation (ICIC) may be handled in the time, frequency and/or spatial domains.

Figure 26:
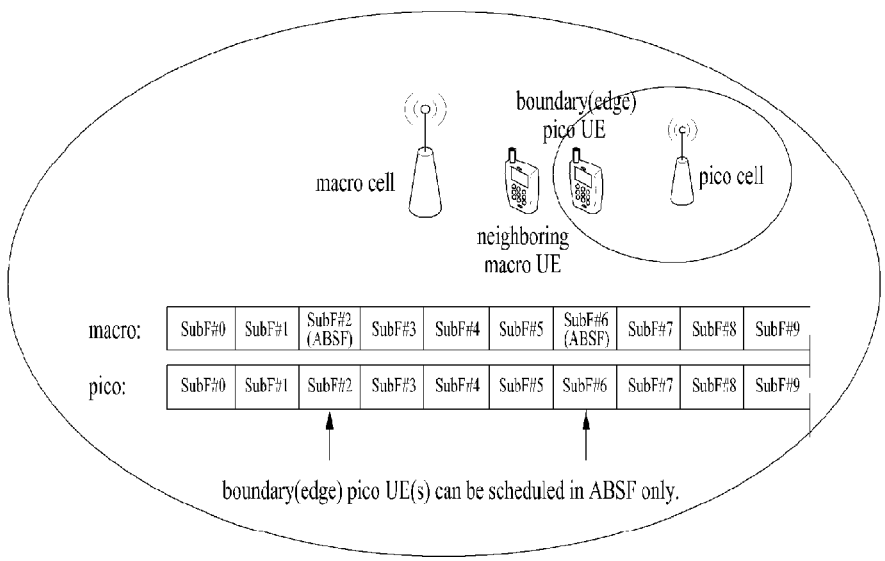
FIG. 26 illustrates a method for eliminating inter-cell interference in a heterogeneous network.

FIG. 26 illustrates a method for cancelling inter-cell interference in a HetNet. Assume that a target that needs to be protected from inter-cell interference is a pico UE for convenience. In this case, an aggressor causing interference is a macro cell (or macro eNB). This example relates to a case in which an aggressor cell uses a time domain interference cancellation method.

Referring to FIG. 26, the macro cell causing inter-cell interference can allocate an almost blank subframe (ABS) (or ABSF) to a radio frame. The ABS refers to a subframe SubF in which DL signals other than a specific DL signal are not transmitted (or DL signal transmission/power is limited or DL interference is restricted). The ABS can be repeated such that it has a specific pattern in one or more radio frames (e.g. 4 radio frames). In the example of FIG. 26, the ABS is set to subframes #2/#6.

The macro cell signals an ABS configuration (e.g. 40-bit bitmap) to the pico cell through a backhaul link and the pico cell can schedule a pico UE using the ABS configuration. For example, a (cell boundary) pico UE can be scheduled in an ABS period only. That is, the pico UE can receive a less interfering signal from the pico cell by being scheduled in the same pico subframe as the ABS. Accordingly, a UE (i.e. pico UE) of a victim cell, particularly, the cell boundary UE needs to report CSI about a less interfered subframe for efficient scheduling. A set of less interfered subframes is referred to as a restricted subset. That is, the restricted subset refers to a subframe set in which channel measurement for corresponding CSI reporting is permitted. Two restricted subsets are defined through RRC signaling and a UE separately performs periodic and aperiodic CSI reporting for each restricted subset in a conventional system.

Figure 27:
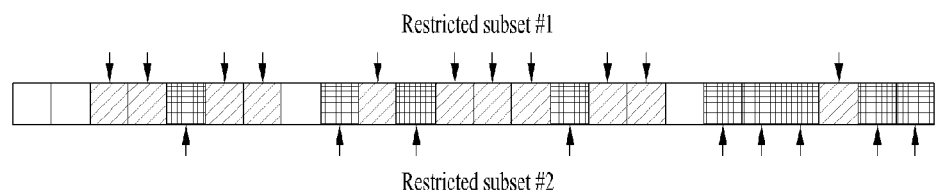
FIG. 27 illustrates an exemplary configuration of a restricted subset in a single carrier situation.

FIG. 27 illustrates an exemplary configuration of a restricted subset in a single carrier situation. In FIG. 27, each block represents a subframe.

Referring to FIG. 27, plural restricted subsets (e.g. restricted subset #1 and restricted subset #2) for one or more radio frames are independently configured. Each restricted subset may be configured through higher layer (e.g. RRC) signaling and a detailed pattern thereof may be indicated using a bitmap. For example, bit positions in the bitmap respectively correspond to subframes in a restricted subset configuration period. When a bit value is 1, channel measurement can be permitted in the corresponding subframe. When a bit value is 0, channel measurement may be prohibited in the corresponding subframe. A restricted subset pattern cycle may correspond to an ABS pattern cycle (e.g. 40 ms, 4 radio frames). One of restricted subsets #1 and #2 may correspond to an ABS pattern but may be operated such that it does not correspond to the ABS pattern. Similarly, the other may be operated such that it does not correspond to a non-ABS pattern although it may correspond to the non-ABS pattern. Restricted subset #1 and restricted subset #2 may overlap in some subframes. Furthermore, the sum of restricted subset #1 and restricted subset #2 may correspond to part of all subframes.

In FIG. 27, a UE separately performs periodic and aperiodic CSI reporting for each of restricted subset #1 and restricted subset #2. In the case of periodic CSI reporting, a periodic CSI configuration (e.g. CSI reporting period and a subframe offset for CSI reporting) can be set for each restricted subset. A CSI reporting period/offset can be set per CSI information (e.g. CQI, PMI and RI) in a restricted subset. In the case of aperiodic CSI reporting, the eNB can trigger CSI reporting in consideration of positions of subframes in which available CSI resources (e.g. CRS, CSI-RS or the like) are present and CSI reporting time. For example, when a PDCCH signal requesting aperiodic CSI reporting is received in a subframe corresponding to restricted subset #1, the UE can perform CSI reporting on restricted subset #1.

When a plurality of restricted subsets is configured, since a periodic CSI configuration is set per restricted subset, periodic CSI reports of the same type may collide with each other at the same time. This may cause an undesirable situation considering intermodulation distortion (IMD) or cubit metric (CM) because multiple PUCCH resources are simultaneously transmitted in one subframe. In this case, a method for solving CSI collision may be similar to a method for solving CA CSI collision. In case of CA, a periodic CSI configuration is set per serving cell and thus a plurality of CSI reports on a plurality of serving cells may collide in the same subframe. Since a periodic CSI report can be transmitted in a UL PCell only, multiple PUCCH resources are simultaneously transmitted in one subframe of the UL PCell. To solve this problem, only one CSI report is transmitted for single carrier characteristics when CSI collision occurs in CA. For example, if multiple CSI reports collide in the same subframe, a CSI report having highest priority is selected. If a plurality of CSI reports having highest priority is present, a CSI report having a lowest cell index is selected. CSI report priority is determined according to PUCCH report type.

Table 6 shows PUCCH report types. CSI is determined according to PUCCH report type. The PUCCH report type may be called an equivalent term, for example, PUCCH format. When a PUCCH report type and a period/offset of CQI/PMI/RI are given, the UE performs CSI reporting in a predetermined subframe based on the PUCCH report type.

TABLE 6

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 2 | Wideband CQI/PMI | 2 TX antennas RI = 1 | 6 | 6 | NA | NA |
| | | 4 TX antennas RI = 1 | 8 | 8 | NA | NA |
| | | 2 TX antennas RI > 1 | 8 | 8 | NA | NA |
| | | 4 TX antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

Similarly to a CA case, when multiple CSI reports on multiple restricted subsets collide in the same subframe, a CSI report having highest priority is selected and, multiple CSI reports having highest priority are present, one of the multiple CSI reports can be selected in consideration of restricted subset index.

Figure 28:
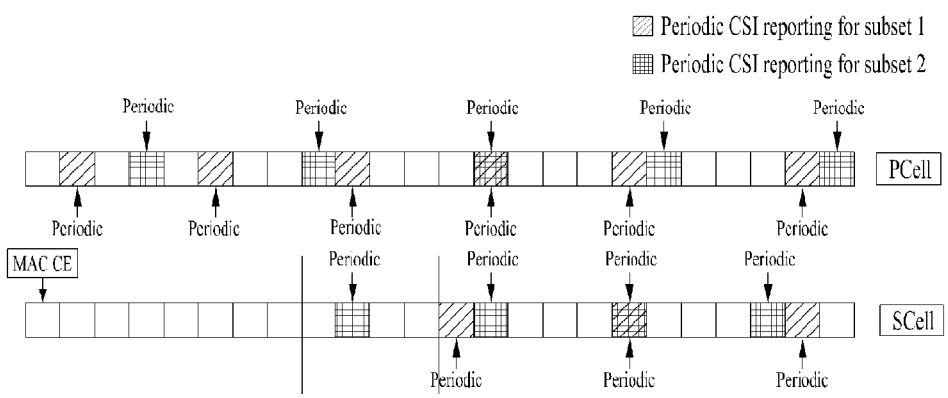
FIG. 28 illustrates exemplary operation of a UE to perform CSI reporting in a heterogeneous network supporting carrier aggregation (CA)

FIG. 28 illustrates an exemplary operation of a UE to perform CSI reporting in a heterogeneous network supporting CA. While it is assumed that a pico UE performs CSI reporting for convenience, a macro UE may also perform CSI reporting. While FIG. 28 shows a case in which two CCs (i.e. serving cells: PCell and SCell) are aggregated to aid in understanding of description, three or more CCs (i.e. serving cells) may be aggregated.

Referring to FIG. 28, 2 restricted subsets are configured for the PCell and 2 restricted subsets are configured for the SCell. Configuration of the restricted subsets for each serving cell and CSI reporting based on restricted subset configuration are performed as described above. When a plurality of serving cells is aggregated, an SCell can be selectively activated/deactivated by a MAC control element (CE). In an activated serving cell, PDCCH monitoring, transmission of an SRS (when configured), CSI measurement and scheduling, etc. are performed. However, these processes are not performed in a deactivated serving cell. When the MAC CE for activation/deactivation is received in an n-th subframe of the PCell or SCell, the corresponding SCell is activated/deactivated in an (n+x)-th subframe (e.g. x=8).

When a serving cell is activated/deactivated, problems relating to periodic and aperiodic CSI reporting are generated. A problem relating to periodic CSI reporting is described first. In case of periodic CSI reporting, a CSI report on the SCell is triggered in a CSI reporting period previously set through RRC signaling. However, when CSI reporting time corresponds to or precedes a CSI resource (e.g. CRS, CSI-RS or the like) available for CSI measurement due to activation/deactivation of the serving cell, a problems relating to CSI reporting can be encountered if the UE does not generate valid CSI.

To solve this problem, the UE can abandon transmission of a periodic CSI report in a predetermined situation (e.g. when generation of CSI is obstructed, CSI is not present or valid CSI cannot be generated). When a PUSCH is allocated to a subframe for a CSI report, CSI piggybacking on the PUSCH is selectively performed according to whether CSI is dropped or not. Accordingly, the start point of a data region in a PUSCH resource can depend on presence or absence of CSI. This requires blind decoding of UCI and/or data and the number of blind decoding operations increases as the number of serving cells (i.e. CCs) increases, and thus the eNB needs to perform high complexity operations.

Therefore, it is preferable that the UE maintain the start point of the data region in the PUSCH resource even when an available CSI resource is not present and valid CSI cannot be generated. To achieve this, a method of using a dummy bit instead of dropping invalid CSI has been proposed. For example, index 0 can be used to represent a value beyond the range of a CQI table. Furthermore, it is possible to set a wideband CQI value to a maximum value and set a subband CQI value to a positive integer or set the wideband CQI value to a minimum value and set the subband CQI value to a negative integer on the basis of the fact that the subband CQI value is calculated as a difference between a subband CQI index and a wideband CQI index. However, a dummy bit is null information for solving ambiguity of the start point of the data region in a PUSCH resource. Since the number of dummy bits increases as the number of serving cells (i.e. CCs) increases, a large number of dummy bits acts as overhead and the overhead increases if a long time is taken to generate valid CSI or an available CSI resource is not present near.

A problem relating to aperiodic CSI reporting is described. Aperiodic CSI reporting may generate a problem similar to that of periodic CSI reporting. In case of aperiodic CSI reporting, a CSI report set is configured through RRC and a CSI reporting target is designated through a CSI request field of a PDCCH. Table 7 shows the CSI request field and CSI reporting target.

TABLE 7

| Value of CSI request field (bits) | Description |
| --- | --- |
| 00 | No aperiodic CSI report is triggered. |
| 01 | Aperiodic CSI report triggered for serving cell c |
| 10 | Aperiodic CSI report is triggered for a $1^{st}$ set of serving cells configured by higher layers. |
| 11 | Aperiodic CSI report is triggered for a $2^{nd}$ set of serving cells configured by higher layers. |

Referring to Table 7, when the CSI request field indicates 10 or 11, the UE needs to transmit CSI on the first or second set of serving cells. However, only an activated serving cell or both the activated serving cell and a deactivated serving cell may exist in each set. In the latter case, CSI can be reported for the activated serving cell only for efficient data transmission. Accordingly, a payload size of CSI is varied according to presence of a deactivated serving cell and blind decoding is required during a PUSCH reception process due to ambiguity of the start point of the data region in a PUSCH resource. Therefore, a method for eliminating ambiguity of the data region in the PUSCH resource by reporting even CSI on a deactivated serving cell at all times even in aperiodic CSI reporting supporting CA has been proposed. For example, CSI (e.g., a payload, resource or the like) corresponding to a deactivated serving cell can be filled with dummy bits. However, when a deactivated serving cell remains in a serving cell set for aperiodic CSI reporting, many dummy bits are used, causing waste of resources.

Figure 29:
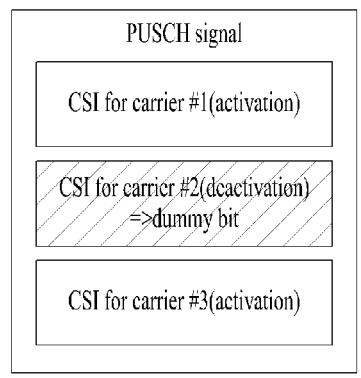
FIG. 29 illustrates CSI reporting using a dummy bit.

FIG. 29 illustrates CSI reporting using a dummy bit. FIG. 29 shows a case in which 3 CCs (or serving cells) (carriers #1, #2 and #3) are aggregated and carrier #2 is deactivated. Assume that carriers #1, #2 and #3 constitute a set for CSI reporting.

Referring to FIG. 29, a UE configures a plurality of CSI blocks regarding carriers #1, #2 and #3 belonging to the same set. The plurality of CSI blocks may be configured as one payload or as an independent payload per carrier. Each CSI block may correspond to each carrier and be arranged in the order of carrier index. The UE transmits the plurality of CSI blocks regarding carriers #1, #2 and #3 to the eNB through a PUSCH. CSI about carriers #1, #2 and #3 is transmitted through the PUSCH. CSI is included in a payload for periodic CSI reporting or a payload for aperiodic CSI reporting. In this example, CSI blocks corresponding to carriers #1 and #3 include CSI since carriers #1 and #3 are activated, whereas the CSI block corresponding to carrier #2 includes a dummy bit since carrier #2 is deactivate.

In a multicarrier situation, periodic CSI reports of the same type collide at the same instant and the frequency of collision may remarkably increase as the number of serving cells increases. Accordingly, an instantaneously varying channel cannot be reflected when the quantity of dropped CSI increases. Furthermore, rank adaptation cannot be performed due to insufficient CSI reports, decreasing cell throughput. Particularly, if a restricted subset is configured in a HetNet, the frequency of collision further increases and thus cell throughput further decreases.

To solve the above-described problem, the present invention proposes a method of transmitting previously dropped CSI instead of transmitting a dummy bit using a resource allocated for a CSI report on a serving cell in which generation of valid CSI is restricted if the serving cell is present. Here, a case in which generation of valid CSI is restricted includes a case in which a CSI resource (e.g. CRS, CSI-RS or the like) for the corresponding serving cell is not available or generation of CSI is restricted at a CSI reporting time. CSI reporting on the serving cell may be restricted according to activation/deactivation. However, the present invention is not limited thereto.

In one implementation, the present invention may configure a plurality of CSI blocks corresponding to a plurality of serving cells in a first set and transmit a first PUSCH signal including the plurality of CSI blocks in a first subframe. When a plurality of serving cells includes a predetermined serving cell in which generation of CSI is restricted, a CSI block corresponding to the predetermined serving cell includes specific CSI related to a second subframe. The second subframe may include a subframe in which CSI reporting has been performed prior to the first subframe.

Figure 30:
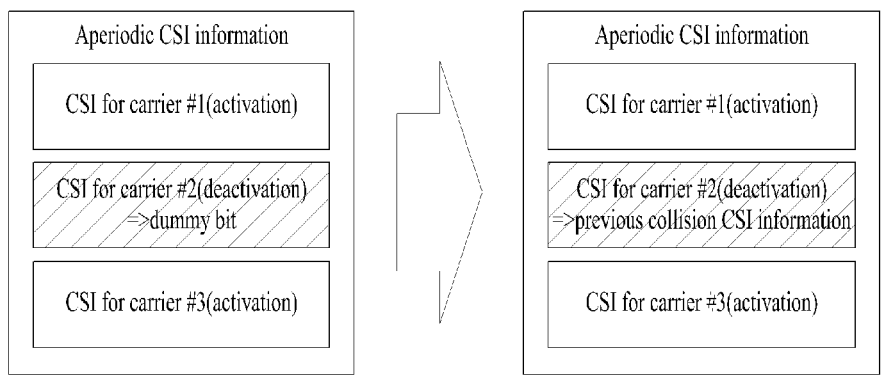
FIG. 30 illustrates a CSI reporting method according to an embodiment of the present invention.

FIG. 30 illustrates a CSI reporting method according to an embodiment of the present invention. FIG. 30 shows a case in which 3 CCs (or serving cells) (carriers #1, #2 and #3) are aggregated in a CA situation and carrier #2 is deactivated for convenience. The example shown in FIG. 30 may be performed in a HetNet. Furthermore, while the example shown in FIG. 30 illustrates transmission of an aperiodic CSI report through a PUSCH, this method may be equally/similarly applied to transmission of a periodic CSI report through a PUSCH. Assume that carriers #1, #2 and #3 constitute a set for aperiodic CSI reporting.

Referring to FIG. 30, a UE configures a plurality of CSI blocks regarding carriers #1, #2 and #3 belonging to the same set. The plurality of CSI blocks may be configured as one payload or as an independent payload per carrier. Each CSI block may correspond to each carrier and be arranged in the order of carrier index. The UE transmits the plurality of CSI blocks regarding carriers #1, #2 and #3 to the eNB through a PUSCH. In the example of FIG. 30, CSI blocks (CSI blocks #1 and #3) corresponding to carriers #1 and #3 include CSI since carriers #1 and #3 are activated. The CSI block (CSI block #2) corresponding to carrier #2 may include CSI collided during previous periodic CSI reporting, preferably, dropped CSI (referred to as collided CSI for convenience).

Collided CSI replacing a dummy bit may be transmitted through various methods. Here, collided CSI includes CSI collided during periodic CSI reporting immediately prior to aperiodic CSI reporting. Furthermore, collided CSI includes CSI collided during periodic CSI reporting within a predetermined range prior to aperiodic CSI reporting.

For example, information having highest priority from among CSI collided for a predetermined period of time can be transmitted through CSI block #2. Specifically, when plural pieces of CSI are dropped, CSI having highest priority according to PUCCH report type can be selected and, when plural pieces of CSI having the same priority are present, CSI having a lowest cell index can be selected. Alternatively, information having a longest period from among collided CSI can be transmitted through CSI block #2. Alternatively, information about a serving cell that is not included in a triggered aperiodic CSI report set, from among collided CSI, can be transmitted through CSI block #2. For example, if carrier #1 corresponds to CSI report set 1 and carriers #2 and #3 correspond to CSI report set 2, CSI about carrier #1 from among collided CSI can be transmitted through CSI block #2. Alternatively, collided CSI transmitted through CSI block #2 can be determined using the cell ID of a serving cell in which CSI reporting is limited. CSI transmitted through CSI block #2 may be CSI about a carrier (i.e. serving cell) in predetermined relation with the cell ID of carrier #2 although the present invention is not limited thereto. Alternatively, collided CSI for CSI block #2 can be determined by regulations predetermined between the eNB and the UE. Alternatively, collided CSI for CSI block #2 can be determined using information (e.g. CSI type, cell ID, etc.) set through RRC signaling.

The method according to the present invention requires rate matching by a dummy bit in order to eliminate ambiguity of the start point of a data region in a PUSCH resource. However, it is difficult to increase a channel coding rate because the payload size of aperiodic CSI is greater than that of periodic CSI in general. Accordingly, it is possible to transmit collided CSI without performance deterioration and to achieve more robust transmission since other channel coding schemes can be used or various methods for rate matching can be used.

While the above-mentioned method illustrates transmission of aperiodic CSI on a PUSCH, the method is applicable to periodic CSI piggybacked on a PUSCH. For example, when an available CSI resource (e.g. CRS, CSI-RS or the like) is not present in a serving cell, immediately previously collided CSI can be transmitted using a resource for a CSI report on the serving cell. Furthermore, collided CSI can be transmitted according to priority of collided CSI, period, order of the cell ID of the corresponding serving cell or regulations predetermined between the eNB and the UE using the resource for the CSI report on the serving cell in the same manner as in aperiodic CSI reporting.

The above-described method transmits previously dropped CSI in order to remove ambiguity of the start point of the data region in the PUSCH resource when valid CSI is not generated due to activation/deactivation or an available CSI (e.g. CRS, CSI-RS or the like) is not present. A dummy bit is transmitted in order to eliminate ambiguity of the start point of the data region in conventional methods. However, a conventional method of using a dummy bit cannot be adapted to channel environment due to high possibility of CSI collision when the number of CCs increases or a restricted subset is defined due to a HetNet environment, causing cell throughput decrease. However, the method proposed by the present invention can adaptively respond to channel environment by transmitting CSI previously dropped due to collision instead of a dummy bit, alleviating cell throughput decrease.

Figure 31:
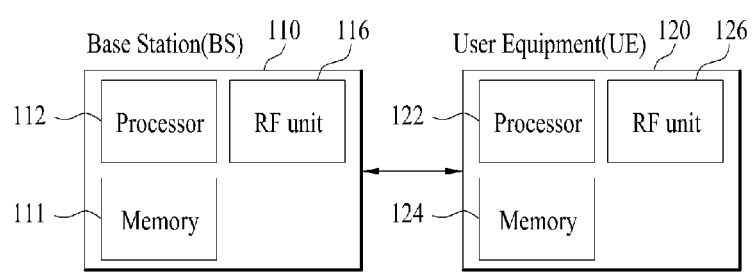
FIG. 31 illustrates configurations of a BS and a UE applicable to the present invention.

FIG. 31 illustrates a BS and a UE applicable to an embodiment of the present invention. When a wireless communication system includes a relay, communication is performed between a BS and the relay on a backhaul link and between the relay and a UE on an access link. Accordingly, the BS or UE shown in FIG. 30 can be replaced by a relay as necessary.

Referring to FIG. 31, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is given, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, a BS or other devices of a wireless communication apparatus. Specifically, the present invention can be applied to a method for transmitting uplink control information and a device for the same.

The invention claimed is:

1. A method for reporting channel state information (CSI) in a wireless communication system, the method comprising:
    configuring a plurality of CSI blocks corresponding to a plurality of serving cells in a first set; and
    transmitting a physical uplink shared channel (PUSCH) signal including the plurality of CSI blocks in a first subframe,
    wherein a CSI block corresponding to an activated serving cell includes CSI for the activated serving cell and a CSI block corresponding to a deactivated serving cell includes specific CSI related to a second subframe,
    wherein the second subframe is included in a subframe set for periodic CSI reporting and CSI reporting of the second subframe is performed prior to the first subframe, and
    wherein the specific CSI corresponds to CSI dropped during CSI reporting in the second subframe.

2. The method according to claim 1, wherein, when plural pieces of periodic CSI are dropped during CSI reporting in the second subframe, the specific CSI includes periodic CSI having highest priority from among the plural pieces of periodic CSI and, when plural pieces of periodic CSI having highest priority are present, the specific CSI includes periodic CSI having a lowest cell index.

3. The method according to claim 1, wherein the specific CSI includes CSI having a longest period from among one or more pieces of periodic CSI dropped during CSI reporting in the second subframe.

4. The method according to claim 1, wherein the specific CSI includes periodic CSI about a serving cell in a second set different from the first set.

5. The method according to claim 1, wherein the predetermined serving cell includes a serving cell deactivated by a medium access control (MAC) element.

6. A communication device configured to report channel state information (CSI) in a wireless communication system, the communication device comprising:
    a radio frequency (RF) unit; and
    a processor,
    wherein the processor is configured to:
    configure a plurality of CSI blocks corresponding to a plurality of serving cells in a first set, and
    transmit a physical uplink shared channel (PUSCH) signal including the plurality of CSI blocks in a first subframe,
    wherein a CSI block corresponding to an activated serving cell includes CSI for the activated serving cell and a CSI block corresponding to a deactivated serving cell includes specific CSI related to a second subframe,
    wherein, the second subframe is included in a subframe set for periodic CSI reporting and CSI reporting of the second subframe is performed prior to the first subframe, and
    wherein the specific CSI corresponds to CSI dropped during CSI reporting in the second subframe.

7. The communication device according to claim 6, wherein, when plural pieces of periodic CSI are dropped during CSI reporting in the second subframe, the specific CSI includes periodic CSI having highest priority from among the plural pieces of periodic CSI and, when plural pieces of periodic CSI having highest priority are present, the specific CSI includes periodic CSI having a lowest cell index.

8. The communication device according to claim 6, wherein the specific CSI includes CSI having a longest period from among one or more pieces of periodic CSI dropped during CSI reporting in the second subframe.

9. The communication device according to claim 6, wherein the specific CSI includes periodic CSI about a serving cell in a second set different from the first set.

10. The communication device according to claim 6, wherein the predetermined serving cell includes a serving cell deactivated by a medium access control (MAC) element.

* * * * *